United States Patent [19]

Yamamoto et al.

[11] Patent Number: 5,744,819
[45] Date of Patent: Apr. 28, 1998

[54] LIQUID CRYSTAL DISPLAY AND HEATER CONTROL CIRCUIT FOR USE WITH SAID DISPLAY

[75] Inventors: Takashi Yamamoto, Yamato; Shigeru Noda, Kawasaki; Hiroyuki Yokomizo, Atsugi; Hiroshi Takabayashi, Kawasaki; Makoto Uehara, Yokohama; Mitsuo Iwayama, Odawara, all of Japan

[73] Assignee: Canon Kabushiki Kaisha, Tokyo, Japan

[21] Appl. No.: 945,625

[22] Filed: Sep. 16, 1992

[30] Foreign Application Priority Data

| Sep. 20, 1991 | [JP] | Japan | 3-268790 |
| Oct. 3, 1991 | [JP] | Japan | 3-281892 |
| Jan. 27, 1992 | [JP] | Japan | 4-034028 |

[51] Int. Cl.$^6$ .......................... H01L 29/04; H01L 31/036
[52] U.S. Cl. ........................... 257/59; 257/72; 349/59; 349/72; 349/192
[58] Field of Search .................. 359/44, 86; 349/58, 349/192, 72; 257/72, 59

[56] References Cited

U.S. PATENT DOCUMENTS 4,763,992 8/1988 Takada et al. .
4,773,735 9/1988 Ukrainsky et al. .
5,150,231 9/1992 Iwamoto et al. ................. 359/83

FOREIGN PATENT DOCUMENTS 0239247 9/1987 European Pat. Off. .
0438093 7/1991 European Pat. Off. .
1237521 9/1989 Japan .

OTHER PUBLICATIONS

Patent Abstracts of Japan Section P:P-976 vol. 13 No. 566 p. 144 & JP 1237519 * Abstract *.

*Primary Examiner*—Tom Thomas
*Assistant Examiner*—Fetsum Abraham
*Attorney, Agent, or Firm*—Fitzpatrick, Cella, Harper & Scinto

[57] ABSTRACT

There is disclosed a liquid crystal display comprising a liquid crystal panel having a pair of boards each formed with an electrode and arranged oppositely, and a liquid crystal disposed between said boards, a heater provided near or adjacent said panel, means for detecting the temperature of said panel, and a control circuit for controlling the amount of heat generated by said heater in accordance with a comparison result between an output of said detecting means and a first set temperature for use when said liquid crystal panel is in a service state, or a second set temperature for use when said liquid crystal panel is in a non-service state.

21 Claims, 17 Drawing Sheets

SMECTIC A PHASE, THRESHOLD CHANGE BY RESTORING CONTROL

SMECTIC A PHASE, CHANGE IN CELL THICKNESS BY RESTORING CONTROL

RESTORING CONTROL TIME

LIQUID CRYSTAL DISPLAY AND HEATER CONTROL CIRCUIT FOR USE WITH SAID DISPLAY

BACKGROUND OF THE INVENTION

1. Field of the Invention

The present invention relates to a liquid crystal display with a ferroelectric liquid crystal, and more particularly to a ferroelectric liquid crystal display having a heater, and an realignment control circuit for the ferroelectric liquid crystal display having a heater control circuit therefor and a planar heater.

2. Related Background Art

Instead of nematic liquid crystals which have been conventionally used in most cases, ferroelectric liquid crystals have been recently used as the liquid crystal display element which has a large screen and a large capacity. The ferroelectric liquid crystals have the features of the high speed response and the bistability, as well as the following controversial characteristics.

①  The switching threshold of a ferroelectric liquid crystal greatly varies with the temperature, and the response speed is slower at a lower temperature.

②  The structure of a ferroelectric liquid crystal is different depending on the temperature, in which it takes a layer structure in the chiral smectic phase and has the ferroelectricity, but is changed from the chiral smectic phase to a crystalline state in the range of low temperatures. Once crystallized, it can not be restored to an original uniform layer structure when it is returned to an ordinary temperature, resulting in an unsuitable state for the display. In order to form such an uniform layer structure again, the liquid crystal is necessary to be heated up to a cholesteric phase or isotropic liquid phase, and then cooled slowly. This heat treatment is referred to as a re-alignment.

③  If a liquid crystal is subjected to a mechanically strong external force, the layer structure of a ferroelectric liquid crystal will collapse, thereby causing orientational defects such as sanded texture. If an image is displayed in this state, regular switching of the ferroelectric liquid crystal may be damaged, so that an excellent image can not be obtained. In this case, no self-repairness is afforded, whereby the realignment treatment is necessary.

Conventional ferroelectric liquid crystal displays are provided with heating means such as a heater to compensate for the temperature characteristic of the response speed, thereby heating the liquid crystal panel to a temperature suitable for the image display, or retaining heat to prevent the crystallization under the low temperature environments. However, the temperature required for the liquid crystal panel to make the re-alignment is typically as high as 70° to 100° C., which takes some considerations for the safety. Thus, in performing the re-alignment, it has been the common practice that the liquid crystal panel is taken out from the unit, and heated and cooled slowly in an oven or the like capable of making the precise temperature control.

Also, the re-alignment is an operation for the restoration from a defective state such as the crystallization or sanded texture, which is generally conducted with low occurrence frequency. Therefore, it is generally required to implement means for the display to compensate for the temperature and retain heat for the prevention of crystallization without adding many associated parts.

To resolve the above-mentioned problem, there has been devised a liquid crystal display containing a plate-like heating member (thereinafter referred to as a heater) as described in Japanese Laid-Open Patent Application No. 1.-237521, a liquid crystal display containing a heater as shown in FIG. 1, or a liquid crystal display containing a planar heating member as shown in FIG. 2. In FIG. 1, 100 is a liquid crystal panel, 101, 102 are glass substrates for forming the liquid crystal panel, 103 is an upper polarizer plate, 104 is a protective glass, 105 is a lower polarizer plate, 106 is a glass, 107 is a light source for the backlight, and 108 is a diffuser plate. That is, light emitted from the light source 107 is diffused by the diffuser plate 108 to be homogeneous light to pass through the glass 106, the lower polarizer plate 105, the liquid crystal panel 100, the upper polarizer plate 103, and the protective glass 104, in sequence, whereby based on the information of the liquid crystal panel 100, the image information is displayed.

109 is a film for printed circuit, 110 is a circuit board, 111 is a panel fixing substrate, 112 is an adhesive, 113 is a supporting member, 114 is a resilient member, 115 is a frame, 116 is a temperature detection element, 117 is a heater (planar heater), 118 is an adhesive, 119 is a heater control substrate, and 121 is a space portion. Based on the information detected by the temperature detection element 116, a circuit within the heater control substrate 119 controls the driving of the heater 117, thereby resolving the above-mentioned problem.

In FIG. 2, 201 is a liquid crystal panel having sealed a ferroelectric liquid crystal therein, to both faces of which an upper polarizer plate 202 and a lower polarizer plate 203 are secured with an adhesive, and supported on a support board 209. 208 is a backlight for illuminating the liquid crystal panel 201 from the back side, having a planar heater 205 bonded in close contact on its surface. The planar heater 205 has a transparent electric conducting layer formed on one face of the glass, and is provided with lead-out electrodes at both ends. 210 is a circuit board having a liquid crystal drive circuit and a planar heater control circuit, which is connected via a lead 204 to the liquid crystal panel 201 and via a lead 206 to the planar heater 205. And the planar heater control circuit of the circuit board 210 controls the amount of heat generated by the planar heater 205 based on a signal from a temperature detection element 207 attached to the liquid crystal panel 201, thereby resolving the above-mentioned problem.

FIG. 3 shows an example of the temperature characteristic for the writing frequency of one scan line for a liquid crystal. The writing frequency of one scan line indicates the response speed of liquid crystal, in which the greater this value, the higher quality of image can be displayed. As can be seen from FIG. 3, the temperature characteristic of liquid crystal has a tendency that when the temperature is higher, the response speed is faster with a more improved image quality. In order to sufficiently exhibit the display ability of the liquid crystal display, the planar heater is controlled to be at a set value of a certain high temperature.

By the way, a conventional liquid crystal device was always held at such a certain high set temperature as previously described to prevent the crystallization of liquid crystal, as the heater (planar heater) was in an energized state even during the non-service. Hence, the liquid crystal as well as peripheral members disposed therearound and electronic circuits for controlling and driving the liquid crystal were always subjected to high temperatures, whereby there was a problem that the degradation in the quality was accelerated, and the life of the entire device was shortened.

Also, there was problem that a relatively great fixed amount of the electric power was consumed irrespective of whether the display was in the service state or not.

On the other hand, when the temperature was set lower in consideration of the reliability of members or the control/ drive circuit and the amount of consumption power in the heater, the response speed of liquid crystal decreased by the corresponding amount, thereby degrading the image quality, so that the ability of the liquid crystal display could not be sufficiently exhibited, whereby it was difficult to completely avoid the essential problem as previously described.

Further, the following problem associated with the durability of a liquid crystal cell may arise in some cases.

It is known that liquid crystal molecules are moved to some extent by a non-selective signal in driving the matrix. This is clear because if the optical response of a pixel to which the non-selective signal is applied is investigated, it is indicated that the light quantity therein has varied in synchronism with the applied pulse. In a so-called spray alignment (in which the direction of the molecular longitudinal axis involves a great angular torsion between upper and lower boards), such fluctuation of molecule has no problem except for a certain amount of decrease in the contrast, because the display content can be reserved unless the stable position of molecule varies (switches) with such fluctuation.

However, in a uniform alignment cell in which the direction of molecular longitudinal axis involves a relatively small angular variation between upper and lower boards, there is a phenomenon that liquid crystal molecules move within the layer due to an applied voltage (e.g., non-selective signal). A remarkable example of this phenomenon will be described in detail with reference to FIG. 4. FIGS. 4A and 4B are elevational views of a ferroelectric liquid crystal cell showing a cell state before and after applying the voltage, respectively. In this cell, the alignment treatment was to make the rubbing on a polyimide thin film. In both FIGS. 4A and 4B, upper and lower boards are rubbed in parallel from the bottom toward the top. With such an alignment treatment, a smectic layer 42 of ferroelectric liquid crystal 44 is created orthogonally to a rubbing direction 41, as shown in FIG. 4C.

Where the cell thickness is small enough to release the spiral pitch, the liquid crystal molecule 43 can take two stable states, in one state of which the directions of all molecules 43 within a cell are aligned, and this state is defined a +θ state because of making an angle +θ with respect to a normal vector 46 of the smectic layer 42, as shown in FIG. 4D, whereby the other stable state exists at a position of −θ which is substantially symmetrical with the layer normal. If an electric field (e.g., rectangular wave at 10 Hz, ±8V) is applied to the entire cell in this state (+θ), liquid crystal molecules start to move within the layer from a point A toward a point B in FIG. 4A while retaining an inclination of +θ relative to the layer normal. As a result, if the application of voltage is continued for a long time, the thickness of liquid crystal cell will be varied, and finally a portion free of liquid crystal occurs at an A end, as shown in FIG. 4B, so that the cell thickness is larger in B portion than in A portion.

In such a phenomenon, in a state −θ of the liquid crystal molecules conversely move from B end toward A end, so that a void portion free of liquid crystal like E portion occurs at the B end.

Though the cause is not clear, the change in Vth (threshold voltage) due to each fixed pattern is observed (pattern baking of liquid crystal molecules, monostable), and there is also a phenomenon that the writing pattern remains even if the drive frequency and the drive voltage are changed.

It is needless to say that the existence of such an electrooptically uncontrollable portion is undesirable in the respect of the display quality, and since the cell thickness or Vth varies with time, the drive control of the whole liquid crystal panel is difficult, resulting in a problem as the optical element using a ferroelectric liquid crystal, and particularly a problem with the durability in a fixed pattern such as the non-display region around the display area which is driven only in either one state of +θ or −θ in the practical use, and a half-fixed pattern in, for example, a menu screen of a word processor.

SUMMARY OF THE INVENTION

In the light of the above-mentioned problems, an object of the present invention is to provide a heater control circuit, in a liquid crystal display, capable of assuring a high reliability without decreasing the image quality at the initial service time and during the service, and without expediting the degradation of peripheral members disposed therearound or circuits during the non-service, while preventing the crystallization of liquid crystal with less consumption power.

Also, it is another object of the invention to provide a liquid crystal display which has overcome the above-mentioned problems.

A further object of the present invention is to provide a heater control circuit for carrying out the re-alignment safely in a state where a liquid crystal panel is incorporated into a display unit, without the necessity of disassembling the unit, as well as a liquid crystal display with such a constitution.

Another object of the present invention is to provide a liquid crystal display which realizes the less consumption power and the compactization as compared with the conventional display, in addition to the above-mentioned objects.

Further, another object of the present invention is to provide a liquid crystal display with the improved reliability of the entire unit, which is capable of making the re-alignment in a more practical duration without expediting the degradation of members due to re-alignment, in addition to the above-mentioned objects.

Further, in the light of the above-mentioned problems, another object of the present invention is to prevent the decrease in the durability caused by the movement of liquid crystal in a ferroelectric liquid crystal display.

DETAILED DESCRIPTION OF THE PREFERRED EMBODIMENTS

Figure 1:
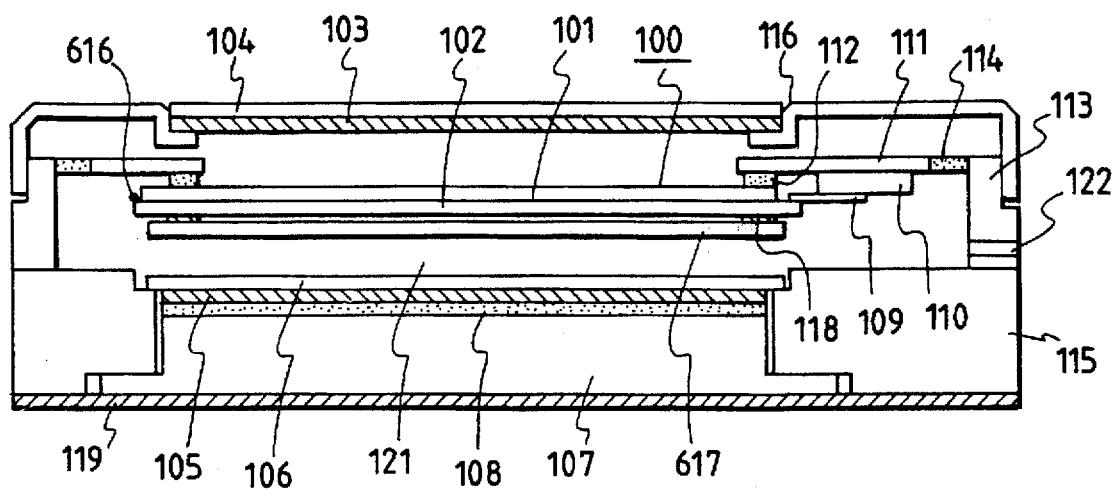
FIGS. 1 and 2 are schematic cross-sectional views for explaining a liquid crystal display.

A liquid crystal display of the present invention which resolves the previously-mentioned problems can be accomplished by having a control circuit for controlling the amount of heat generated by a heater provided near or adjacent a liquid crystal panel in accordance with a first set temperature corresponding to the service state of the liquid crystal panel, or a second set temperature corresponding to the non-service state of the liquid crystal panel.

That is, to accomplish the previously-mentioned objects, the heater is controlled using a first set value at the first temperature during the service of the liquid crystal display, or a second set value at a temperature different from the first set temperature during the non-service thereof.

In this way, the first and second temperatures are respectively set, and the amount of heat generated by the heater can be controlled (a so-called temperature control) based on a temperature selected from the above set temperatures, whereby it is possible to make the temperature control optimal for the conditions and without waste.

According to the present invention, an excellent image can be assured by setting the temperature of liquid crystal at a higher value during the service. During the non-service, the heat generation of a planar heater is suppressed by setting the liquid crystal temperature at a lower value, thereby relieving the thermal stress to peripheral members disposed therearound or a control/drive circuit and preventing the degradation of these members or the circuit, whereby it is possible to assure a high reliability and prevent the crystallization with less consumption power than during the service.

The liquid crystal display of the present invention comprises a clock circuit for clocking the time of energizing the heater provided near or adjacent the liquid crystal panel from the start time of energization, a temperature decision circuit for deciding the temperature based on the temperature information of the liquid crystal panel, and a control circuit for controlling a power supply circuit for regulating the energization to the heater based on the information from the clock circuit and the temperature decision circuit so as to make the re-alignment treatment of liquid crystal.

According to the invention, with such a constitution, it is possible to carry out the re-alignment safely in a state where the liquid crystal panel is incorporated into the display unit, without disassembly, only by making a small addition and extension for the component with a temperature compensation function for the optimal image display and a heat retaining function for preventing the crystallization. Also, owing to a small amount of addition and extension portion, a feature of restoration from a defective state such as the crystallization or sanded texture can be implemented for the re-alignment without a large burden, so that it is possible to provide a display unit making the best use of the features such as a great amount of capacity and a high resolution provided on a ferroelectric liquid crystal.

In the present invention, since among the control circuits of the heater, a control circuit relating to the re-alignment treatment is an external circuit, and a connector for connecting a liquid crystal main body to the external circuit is provided, an effective re-alignment treatment can be made without including any circuit relating to the re-alignment treatment, so that a further compactization and cost reduction can be realized.

Further, a power supply source for the re-alignment treatment is provided separately, and a connector to this power source is provided, whereby it is unnecessary to provide the power source for the re-alignment treatment requiring a high energy within the unit, so that a further compactization, light weight and cost reduction can be realized.

That is, the temperature necessary for the re-alignment is as high as 70° to 100° C., as previously described, but the liquid crystal display is characterized by having a small unit volume relative to the screen size, wherein the circuit board for the planar heater control circuit or the liquid crystal display control circuit is disposed near the liquid crystal panel, that is, immediately near the planar heater. Therefore, the operating temperature of these circuit boards needs take into consideration the re-alignment temperature, and must cover a wider range including higher temperatures than in the normal operating temperature range. The consumption power at the re-alignment is several times that necessary for the other temperature controls, and the power capacity of a temperature control circuit must be designed in accordance with a capacity at the re-alignment.

On the contrary, according to the present invention, the planar heater control circuit contained within the main body is a circuit for dealing with a relatively small power for the temperature control except for the re-alignment, and a planar heater control circuit dedicated for the re-alignment is connected from the external, with the contained circuit placed at rest, only when the re-alignment is required, so that it is unnecessary to widen the operating temperature range of the temperature control circuit and enlarge the capacity for the feature of the realignment having low use frequencies. Also, at the re-alignment, the liquid crystal drive circuit can be also placed at rest, so that it is unnecessary to widen the operating temperature range of the liquid crystal drive circuit.

Since there is a lower limit for the resistance value of heater, and the consumption power necessary for the re-alignment is large, the supply voltage for the heater exceeds a safety voltage of $42.4V_{O\text{-}P}$ or $60V_{DC}$. Therefore, it is necessary to secure an insulation distance on the safety standards. For a display having a large display area such as a ferroelectric liquid crystal display, the area of heater is also large and made of glass as well as the liquid crystal panel, so that the protective measure against a ball impact test may be possibly difficult. Further, when the power is reduced for the compactization of the unit, the time to reach a temperature necessary for the re-alignment is elongated, and the temperature of peripheral members around the heater is also elevated, whereby the degradation of parts may be expedited and the reliability may be possibly lowered.

On the contrary, according to the present invention, a power source having a lower power contained within the main body and a planar heater control circuit contained therein are used for the temperature compensation for the conditions optimal for the drawing or the heat retention to avoid the crystallization, while in making the re-alignment, a heater control circuit dedicated for the re-alignment using a primary power source capable of supplying a large power is connected from the external, with the circuit contained within the unit placed at rest.

Therefore, most of the portion dealing with the voltage exceeding a safety voltage is disposed in the planar heater control circuit for the re-alignment which is removed out of the unit at the normal service, so that there is little portion requiring a large insulation distance within the unit. The re-alignment is a maintenance work of the servicemen, and does not require any measure against the ball impact test on a large display plane. Moreover, since the contained power source may be low in power and small enough to be necessary for the temperature compensation and the heat retention for the prevention of crystallization, the unit can be made smaller, whereby it is possible to make the best use of the features of the liquid crystal. Moreover, at the re-alignment, the heating can be made with a large power by using a primary power source, whereby the re-alignment can be made in a more practical duration, and the temperature of peripheral members around the planar heater can be suppressed to a low temperature, thereby further improving the reliability of the whole unit without expediting the degradation of members due to the re-alignment.

The embodiments of the present invention will be described below with reference to the drawings.

EMBODIMENT 1

Figure 2:
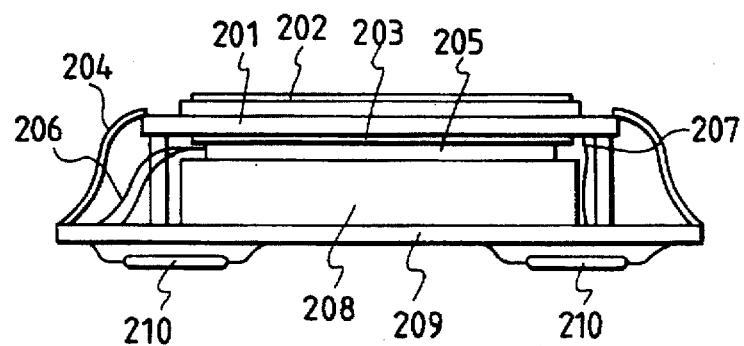

The constitution of a liquid crystal display according to an embodiment of the present invention is shown in FIG. 2. As previously described, in FIG. 2, 201 is a liquid crystal panel having sealed a ferroelectric liquid crystal therein, having an upper polarizer plate 202 and a lower polarizer plate 203 secured with an adhesive on both faces thereof, and supported on a support board 209. 208 is a backlight for illuminating the liquid crystal panel 201 from the back side, having a (plane) heater 205 bonded in tight contact on its surface. The heater 205 has a transparent electric conducting layer formed on one face of glass, and is provided with lead-out electrodes at both ends thereof. 210 is a circuit board having a liquid crystal drive circuit and a heater control circuit, and connected via a lead 204 to the liquid crystal panel 201 and via a lead 206 to the planar heater 205. And the heater control circuit on the circuit board 210 controls the amount of heat generated by the heater 205 based on a signal from a temperature detection element 207 attached to the liquid crystal panel 201. Note that the heater 205 is preferably a planar heater from the standpoint of the space efficiency, and preferably a thin film planar heater from the standpoint of the homogeneous heat generation over the entire heater, but the shape of heater is not limited to this plane-type. If the desired heating can be conducted without adverse effects on the image quality, a wire or ribbon heater may be used.

Figure 5:
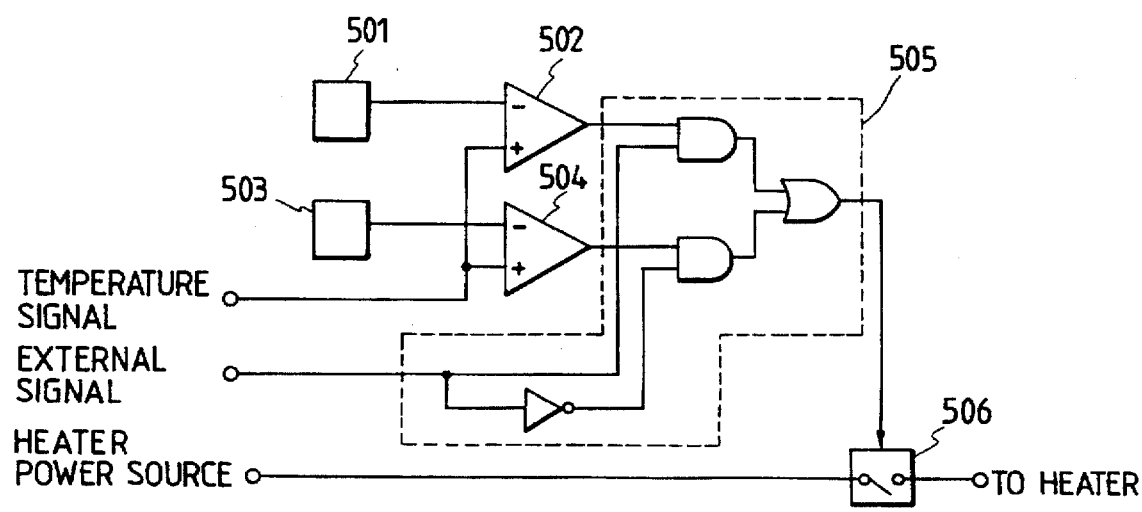
FIG. 5 is a block diagram for explaining a configuration of a heater control circuit according to an embodiment of the present invention.
Figure 4A:
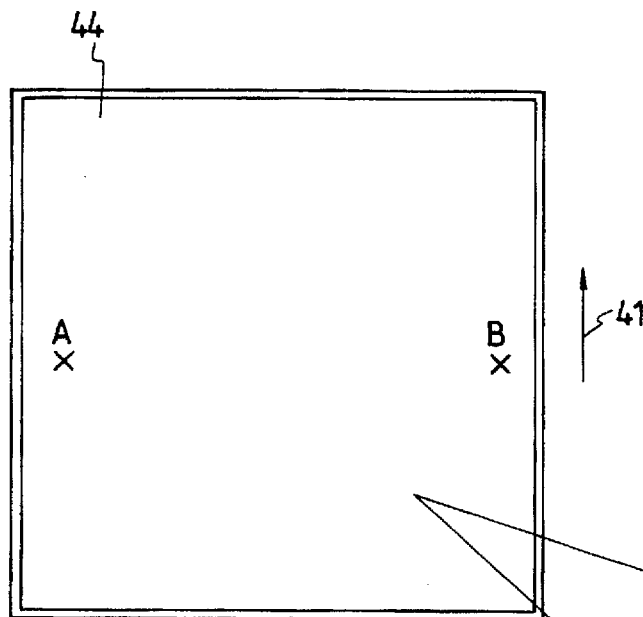
FIGS. 4A–4D are views for explaining the movement of liquid crystal molecules within the layer.
Figure 4C:
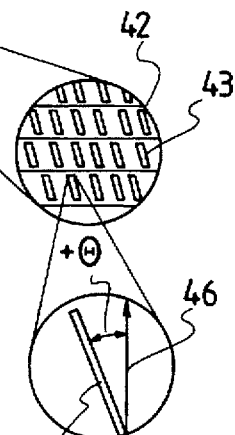
Figure 4B:
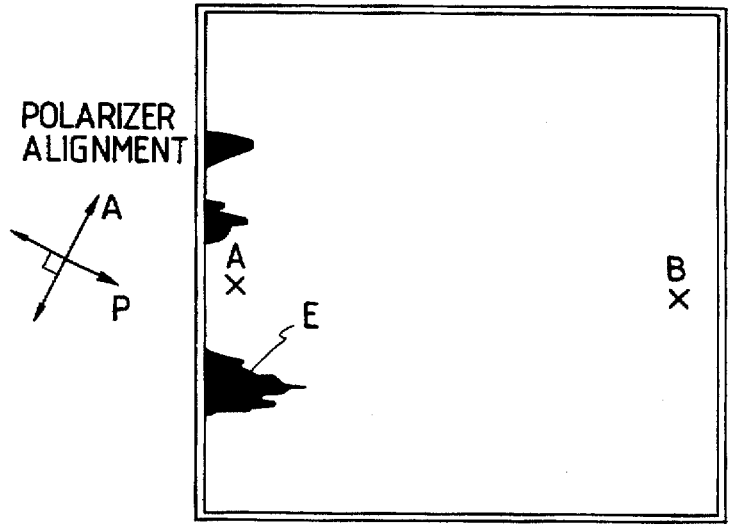
Figure 4D:
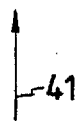

FIG. 5 shows a configuration of a heater control circuit contained in the circuit board as indicated at 210 in FIG. 2. 501 is a signal generator circuit corresponding to a first set temperature at the high temperature side, in which its output signal (first set value signal) is compared with a signal (temperature signal) from the temperature detection element 207 (FIG. 2) by a first comparator 502. 503 is a signal generator circuit corresponding to a second set temperature at the low temperature side, in which its output signal (second set value signal) is compared with a signal (temperature signal) from the temperature detection element 207 by a second comparator 504. A selection circuit 505 selects either of the comparison results from the first comparator 502 and the second comparator 504 in accordance with an external signal, with a selected signal serving to open or close a switch 506 for the planar heater power source.

Figure 3:
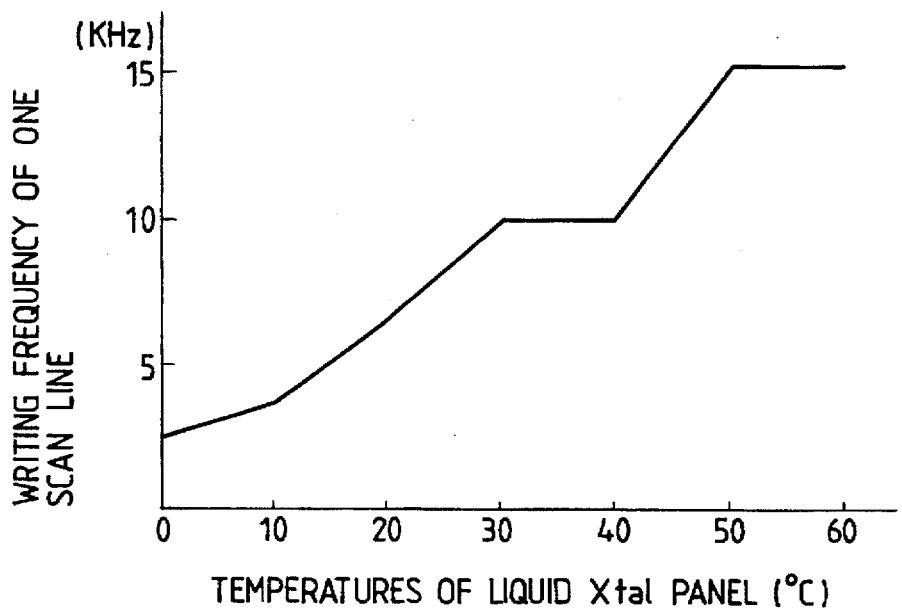
FIG. 3 is a graph representation for explaining an example of the temperature characteristic of the writing frequency of one scan line for a liquid crystal.

According to an experiment of the present inventors, a liquid crystal panel in this embodiment can provide an image quality sufficiently excellent in the practical purposes, as long as the writing frequency of one scan line is about 10 KHz or greater. FIG. 3 is a graph showing the temperature variation of the writing frequency of one scan line for this liquid crystal panel. Referring to FIG. 3, it can be found that the image quality of liquid crystal display can be sufficiently assured by this liquid crystal panel if the liquid crystal temperature is elevated above 30° C. under the low temperature environments. That is, it is sufficient that the temperature setting is 30° C. during the service. Since the temperature elevation due to the self-heating of the panel and the heating with the backlight is about 10° C., the temperature of the liquid crystal panel is above 30° C. when the environment temperature exceeds 20° C., so that the writing frequency of one scan line exceeds 10 KHz, whereby the image quality can be further improved.

Figure 6:
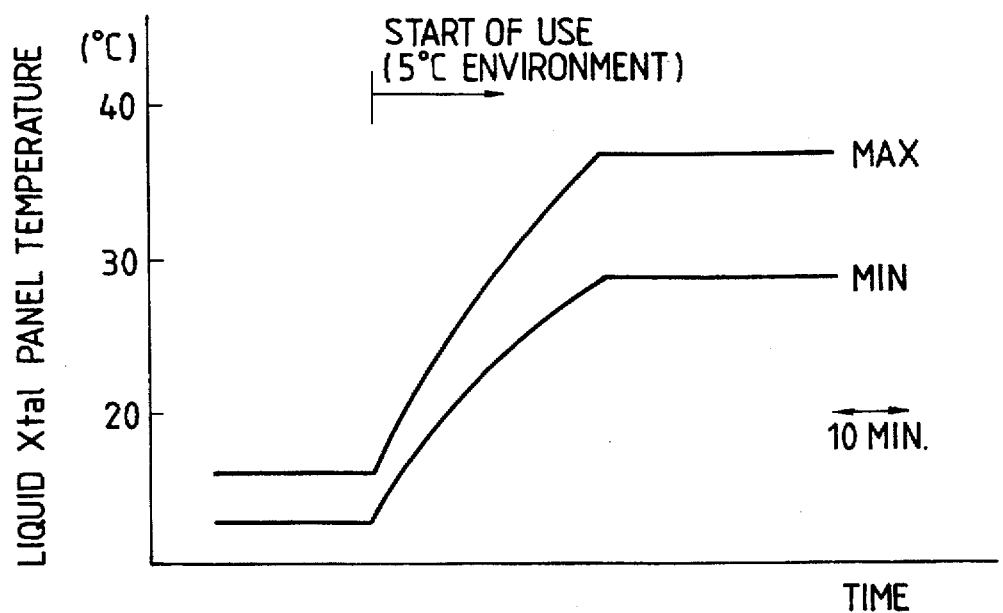
FIG. 6 is a graph representation for explaining the temporal change in the liquid crystal panel temperature according to an embodiment of the present invention.

The temperature setting for the non-service period was made 15° C. corresponding to the amount of temperature elevation by the heater, as a result of taking into consideration a permissible time to wait for the image quality to be improved with the amount of temperature elevation by the self-heating and the heating with the backlight, and the amount of temperature elevation by the heater. The least writing frequency of one scan line permissible at the early service time is about 6 KHz, and accordingly it has been confirmed experimentally by the present inventors that the panel temperature of 17.5° C. can be reached in about 5 minutes under the environment of 5° C. FIG. 6 shows the temporal variation of the liquid crystal panel temperature in switching from the non-service condition to the service condition in this embodiment.

In this embodiment, a temperature difference of 15° C. was provided between the setting temperatures when the liquid crystal display is used and not used. Since in the liquid crystal display used in this embodiment, the heating of the planar heater necessary to elevate the temperature setting of liquid crystal panel by 1° C. is about 1 W, it is possible to suppress the consumption power during the non-service by about 15 W, as compared with the conventional planar heater having a single set temperature. Resin materials are most frequently used for the support member of liquid crystal panel or the backlight, whereby the degradation of such resin material due to the heat can be prevented by lowering the set temperature during the non-service by 15° C. In particular, since the upper polarizer plate and the lower polarizer plate disposed adjacent the liquid crystal panel is weak to the heat, the present invention can remarkably improve the reliability.

EMBODIMENT 2

Figure 7:
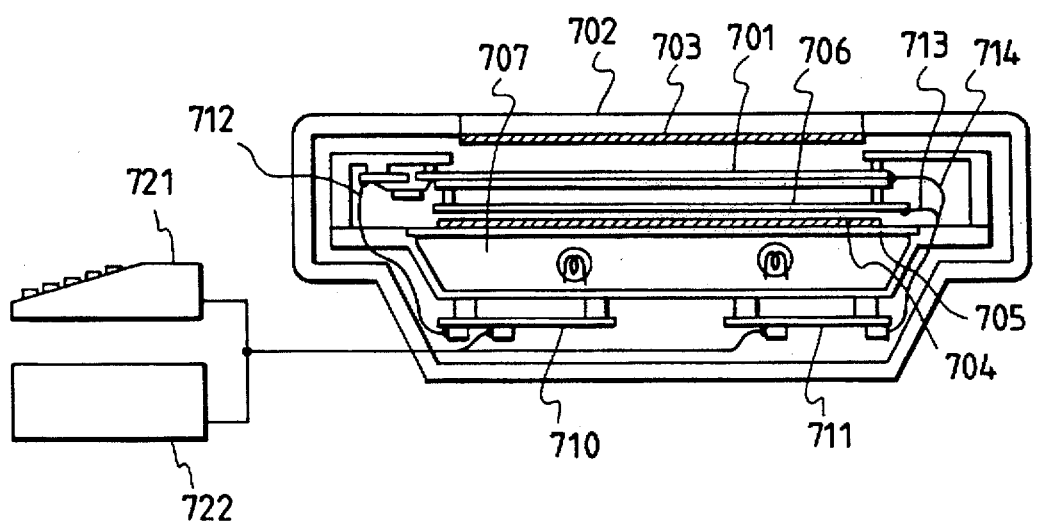
FIGS. 7, 11, 12, 16, 17, 18 and 19 are schematic cross-sectional views for explaining liquid crystal displays according to the embodiments of the present invention, respectively.

FIG. 7 is a view showing a cross section of a liquid crystal display having a heater control circuit according to the present invention. In the same figure, 701 is a liquid crystal panel having sealed a ferroelectric liquid crystal therein, having a heater 706 secured with an adhesive on its back face thereof. An upper polarizer plate 703 and a lower polarizer plate 704 are secured to a display window 702 and a diffuser plate 705 with an adhesive, respectively. 707 is a backlight for illuminating the liquid crystal panel 701 from the back side. The heater 706 has a transparent electric conducting layer formed on one face of glass, and is provided with lead-out electrodes at both ends thereof. 710 is a circuit board for a liquid crystal drive circuit and 711 is a circuit board for a heater control circuit, which are connected via a lead 712 to the liquid crystal panel 701 and via a lead 713 to the heater 706, respectively. And the heater control circuit controls the amount of heat generated by the heater 706 based on a temperature signal from a temperature detection element 714 attached to the liquid crystal panel 701. 721 is a display image information generator circuit, and 722 is a power source.

Figure 8:
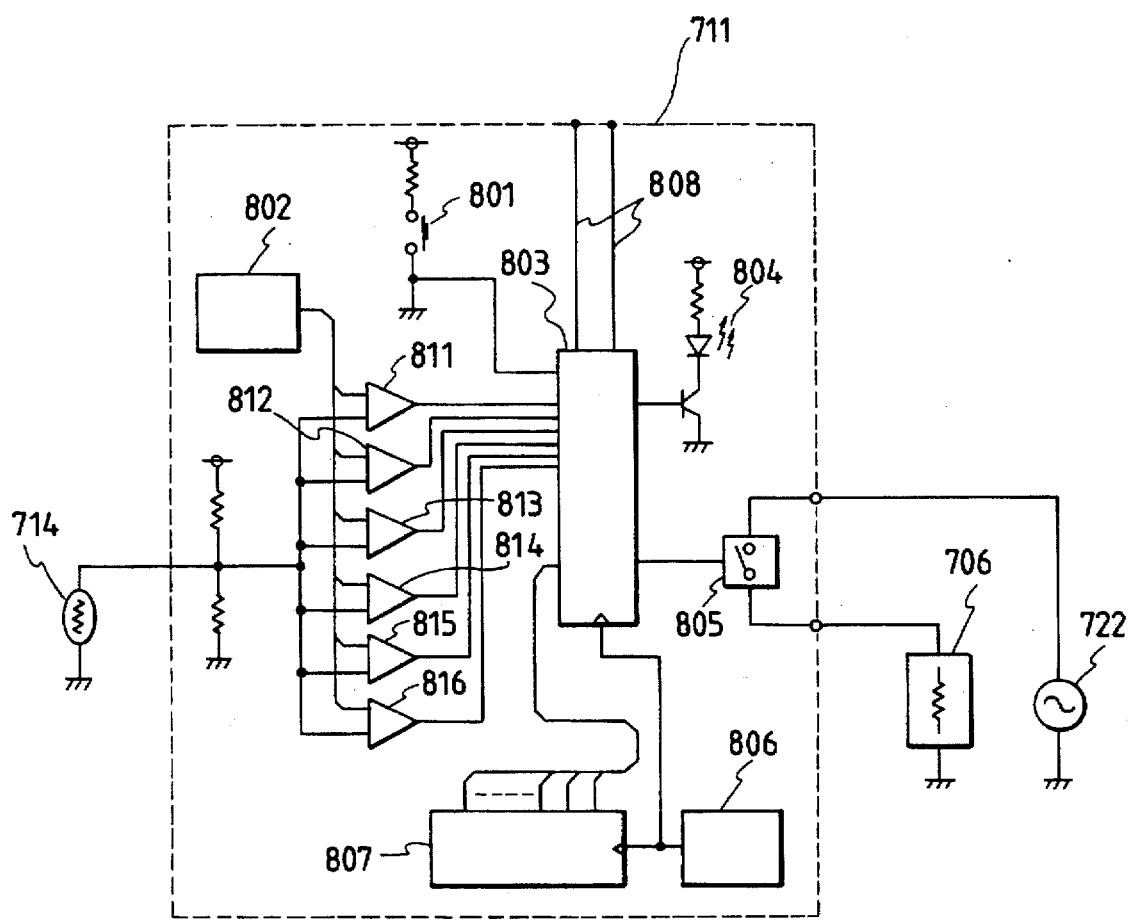
FIGS. 8, 15A, 15B and 20 are block diagrams for explaining the configurations of heater control circuit according to the embodiments of the present invention, respectively.

FIG. 8 is a block diagram showing a configuration of a heater control circuit according to the present invention. 801 is a start switch for the re-alignment, 805 is a power supply circuit for controlling the power to be supplied to the heater 706, which is in this embodiment a switch circuit for turning on/off the power. Of course, the power may be changed in analogue form. 811 is a first temperature decision circuit for deciding whether the temperature indicated by the temperature detection element 714 is equal to or more than a temperature necessary for the re-alignment, 812 is a second temperature decision circuit for deciding whether the temperature indicated by the temperature detection element 714 is equal to or more than an end temperature for the re-alignment, 813 is a third temperature decision circuit for deciding whether the temperature indicated by the temperature detection element 714 is equal to or more than a set temperature of safety timer, 814 is a fourth temperature decision circuit for deciding whether the temperature indicated by the temperature detection element 714 is equal to or more than a preset disconnection deemed temperature of the temperature detection element 714, 815 is a fifth temperature decision circuit for deciding whether the temperature allows for the optimal display of the liquid crystal panel, and 816 is a sixth temperature decision circuit for deciding whether the temperature is equal to or more than a set temperature for preventing the crystallization of the liquid crystal panel. 802 is a circuit for supplying a signal corresponding to a set temperature to the temperature decision element 714, 803 is a control circuit for governing the operation of the heater control circuit, 804 is display means for displaying the state of the heater control circuit during the re-alignment, 806 is a clock generator circuit, 807 is a clock circuit, and 808 is a mode signal for determining the operation mode of the control circuit.

In the following, the operation of the heater control circuit will be described in sequence. The operation mode of the heater control circuit is switched by a mode signal 808. The relation between the mode signal 808 and the operation mode is shown in Table 1.

TABLE 1

| | | MODE SIGNAL ② | |
|---|---|---|---|
| | | Lo | Hi |
| MODE SIGNAL ① | Lo | Heat retention for prevention of crystallization | Temperature compensation operation for optimal display |
| | Hi | Re-alignment operation | Re-alignment operation |

When the operation mode is a temperature compensation, the heater is controlled by being turned on/off to get to an optimal temperature for the liquid crystal panel to make the optimal display. In a heat retention mode, the heater is controlled by being turned on/off so that the temperature of the liquid crystal panel is not less than a crystallization temperature.

When the operation mode is a re-alignment, the unit is placed in a wait state to wait for a start signal from the start switch 801. Upon a start signal, the control circuit 803 turns on the switch circuit 805 to start the conduction to the heater, and the panel temperature is monitored by the third decision circuit 813 until it exceds a safety timer set temperature. In parallel therewith, the clock circuit 807 clocks from the start of conduction, and when a safety timer set time is reached while the safety timer set temperature is not exceeded, the re-alignment is stopped as the abnormal end, and an error message is displayed by the display circuit 804. This operation is a safety measure against a phenomenon where the temperature detection means can not make a mechanically correct temperature detection although it is electrically normal. For example, when the temperature detection means placed in contact with the liquid crystal panel is about to be released due to some external force. When the environmental temperature and the consumption power are changed as indicated in Table 2, the temperature of the liquid crystal panel will exceed 50° C. in five minutes at the latest. Since the temperature of the liquid crystal panel will reach a very high degree within the same time, depending on the conditions, as will be described later, the nonconformity leading to run-away of the heater must be detected as early as possible.

TABLE 2

| | Time required for the panel temperature to exceed 50° C. | | | |
|---|---|---|---|---|
| | | Consumption power | | |
| | | 147W | 200W | 270W |
| Environmental temperature | 10° C. | 5 min. | 5 min. | 3 min. |
| | 25° C. | 3 min. | 3 min. | 2 min. |
| | 35° C. | 3 min. | 3 min. | 2 min. |

When the liquid crystal panel temperature exceeds a safety timer set temperature, the first decision circuit 811 continuously monitors the temperature until it exceeds a re-alignment temperature. During this time, the clock circuit 807 continues to clock. When the temperature elevation timer set time is reached but the re-alignment temperature is not reached, this is judged as the abnormality, whereby the re-alignment is stopped and an error message is displayed. As indicated in Table 3, the set time of a temperature elevation timer is 30 minutes in view of the maximum time required for the temperature elevation. The temperature elevation timer is a safety measure against the nonconformity of the temperature detection means. However, when an abnormality to start a temperature elevation timer occurs under the conditions of 35° C. and 270 W at which the duration is at minimum, the temperature of the liquid crystal panel will reach about 400° C. at maximum in thirty minutes. The liquid crystal display used by the inventors uses a synthetic fiber (JBR-ABS, NC411W) of the flame retardant grade UL94-V0 for an outer casing, and uses a synthetic fiber (Lexan, LX2801) of the flame retardant grade 94 V-0 for internal parts, whereby the safety is assured without fuming or nasty smell for over forty minutes although unrepairable thermal breakage may arise under these conditions. When the heater runs away for five minutes under the conditions of 35° C. and 270 W due to a similar nonconformity, the liquid crystal temperature is 100° C. or less, and there is neither damage nor danger except for the nonconformity caused. Therefore, it is desirable to detect the nonconformity in the safety measure using a safety timer as previously described, but a higher safety can be secured if this temperature elevation timer is also used together.

TABLE 3

|  | Time required to reach the re-alignment temperature | | |
| --- | --- | --- | --- |
|  | Consumption power | | |
|  | 147W | 200W | 270W |
| Environmental temperature 10° C. | 24 min. | 16 min. | 10 min. |
| 25° C. | 18 min. | 14 min. | 11 min. |
| 35° C. | 18 min. | 11 min. | 7 min. |

Figure 9:
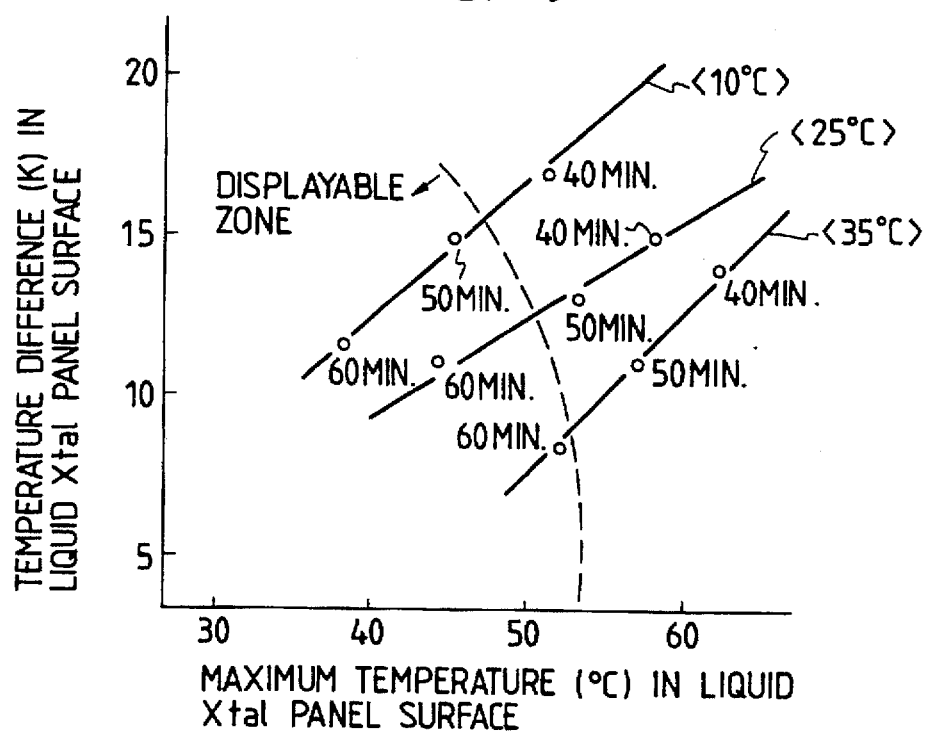
FIG. 9 is a graphic representation for explaining the temperature change in the liquid crystal panel according to an embodiment of the present invention.

When the liquid crystal panel reaches a re-alignment temperature within the temperature elevation timer set time, the control circuit 803 terminates the conduction to the heater, and transfers to a slow cooling state. At this time, the clock circuit 807 is once reset, and starts to clock again from the termination of conduction to the heater. If the passage of sixty minutes from the termination of conduction to the heater is clocked by the clock circuit 807, the re-alignment is terminated. As shown in FIG. 9, the period for which an image can be displayed when the liquid crystal panel temperature falls down is sixty minutes. It is possible to set the control itself of the re-alignment to be ended more early. In this case, immediately after the end, a portion disabling the display of image may remain partially on the screen. When the re-alignment is terminated, it is necessary to confirm whether the re-alignment state suitable for the display is restored, and therefor the re-alignment should be terminated upon reaching a state where the display can be enabled to confirm the screen content.

Figure 10:
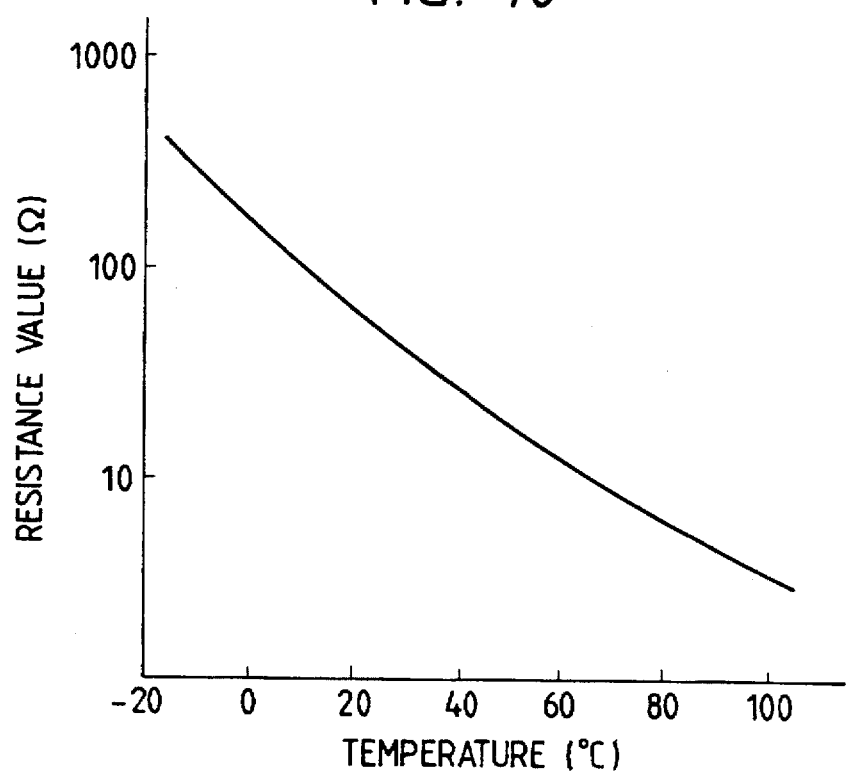
FIG. 10 is a graph representation for explaining the relation between the temperature and the resistance value of temperature detection means.

FIG. 10 shows the relation between the temperature and the resistance value of the temperature detection means. At higher temperature, the resistance is lower, while at lower temperature, the resistance is higher. In a disconnection mode among two modes for the electrical nonconformity of the temperature detection means, there is indicated the possibility of continuous conduction to the heater. Therefore, the region of lower temperatures than in the normal use temperature range is considered as a disconnection deemed region, and the temperature is always monitored by the fourth temperature decision circuit 814 to make the abnormal end in any case. Conversely, in the nonconformity due to a short-circuit, the high temperature is judged, and the conduction to the heater is to be always terminated, so that the safety is not lost.

EMBODIMENT 3

Figure 11:
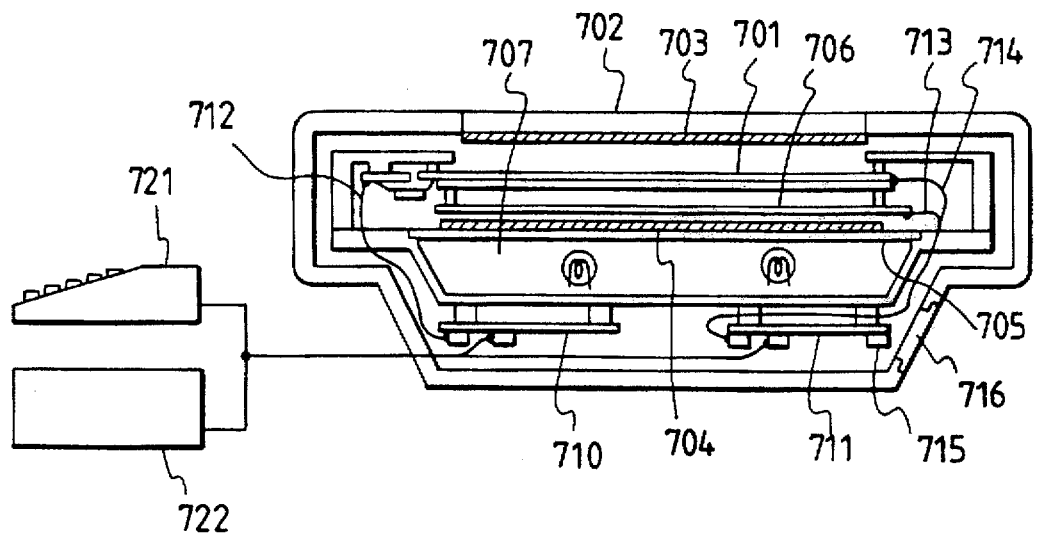

FIG. 11 is a view showing a cross section of another liquid crystal display having a heater control circuit according to the present invention. This is substantially the same as FIG. 7 except that 715 is a connector of a planar heater control circuit for the re-alignment, and 716 is a lid of a liquid crystal display outer package for use in connection thereof.

Figure 12:
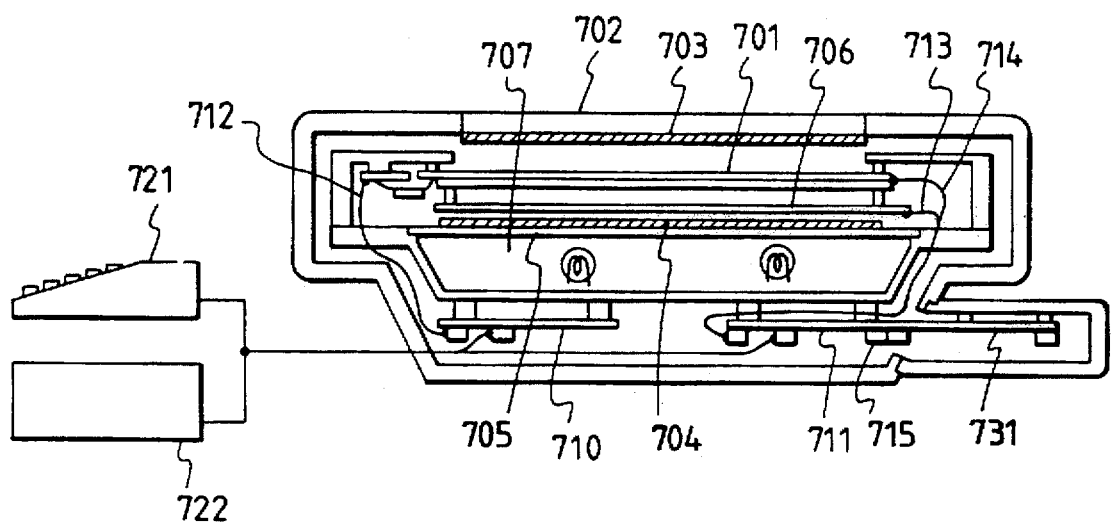

FIG. 12 shows a state where a re-alignment control circuit 731 for carrying out the re-alignment in the unit of FIG. 11 is connected from the outside. At this time, the liquid crystal drive circuit 710 and the planar heater control circuit 711 are not supplied with the current and thus at rest. The re-alignment control circuit 731 is supplied with the power from a power source 722 to energize a planar heater 706 and carry out the re-alignment.

Figure 13:
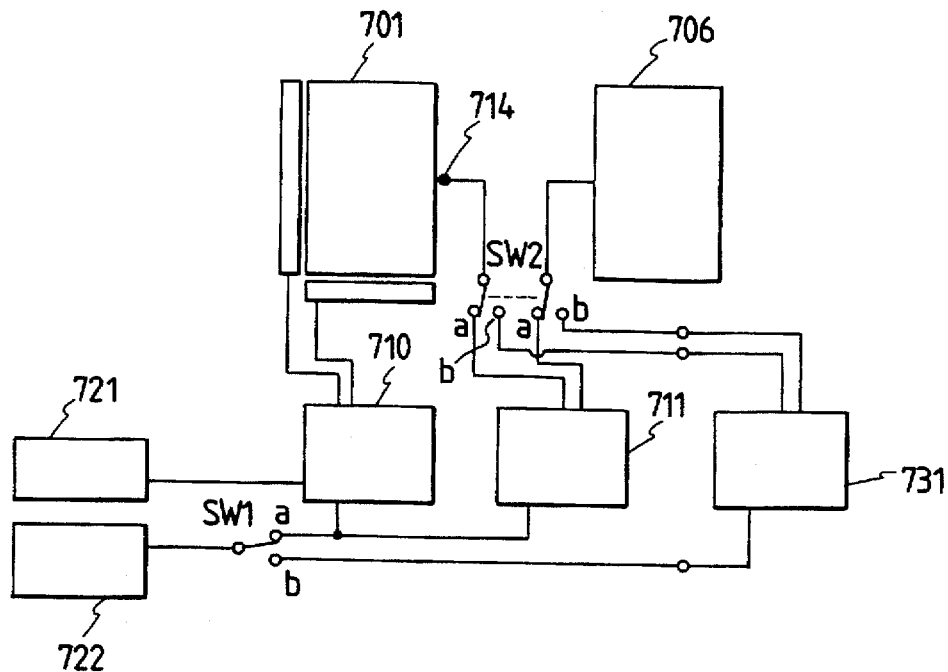
FIG. 13 is a block diagram of an electrical configuration according to the present invention.

FIG. 13 is a block diagram of an electrical configuration according to the present invention. In the normal service state, the liquid crystal drive circuit 710 controls the liquid crystal panel 701 with the power from the power source 722 and a signal from a data generator circuit 721 to display the information. The planar heater 706 is controlled by being turned on/off based on the temperature information from the temperature detection element 714 to retain the liquid crystal panel at a temperature suitable for the drawing. Also, when the unit is not used, the temperature is retained at a required degree so that the temperature of the liquid crystal panel 701 may not be lowered down to a crystalization temperature. When the re-alignment is conducted, SW1 is switched from a side to b side to interrupt the power to the liquid crystal drive circuit 710 and the planar heater control circuit 711 and make a connection to the re-alignment control circuit 731. At the same time, the temperature detection element 714 is switched to the side of re-alignment control circuit 731 using SW2. The liquid crystal panel 701 of FIG. 13 may be either a matrix driven liquid crystal panel or a TFT liquid crystal panel having a switching element.

Figure 14:
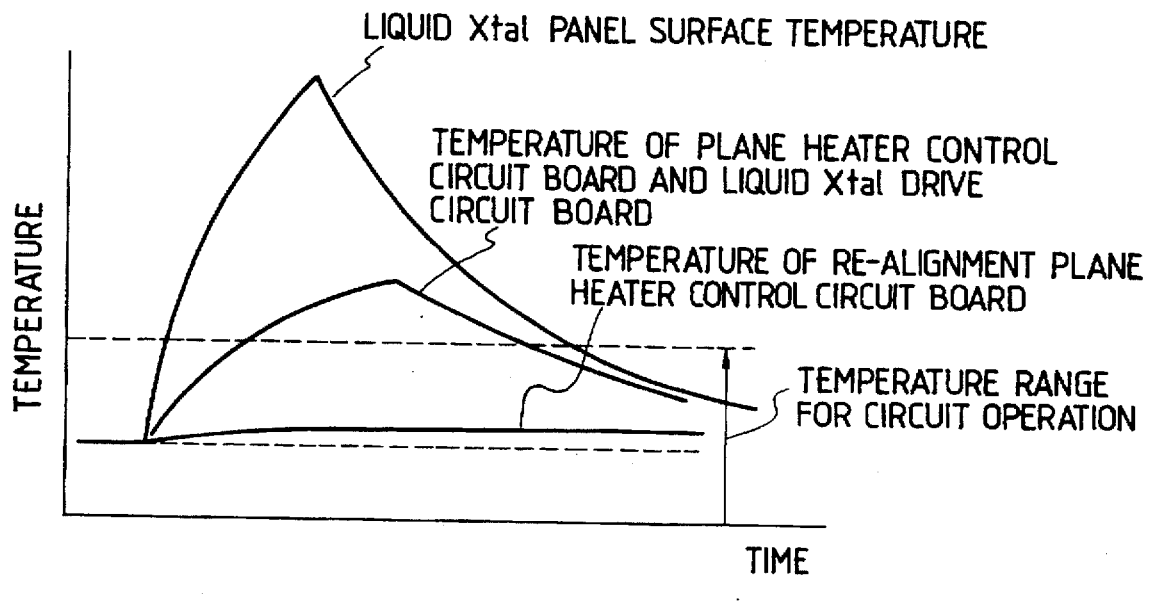
FIG. 14 is a graphic representation for explaining the temperature change of a liquid crystal panel.

FIG. 14 is a graphic representation showing the temperature variation of the liquid crystal panel, the liquid crystal drive circuit, the planar heater control circuit and the re-alignment control circuit, when the re-alignment is carried out. In the re-alignment wherein the liquid crystal panel is heated up to a high temperature, the liquid crystal drive circuit and the planar heater control circuit are heated to a temperature exceeding an operation temperature range of the circuit. The retained temperature range of an electronic circuit is normally wider than the operation temperature range. Since the planar heater control circuit 711 or the liquid crystal drive circuit 710 are placed at rest in the re-alignment, as previously described, there is no problem as long as these circuit boards are in the retained temperature range in spite of exceeding the operation temperature range. The temperature of the re-alignment control circuit connected externally of the unit will hardly rise except for the self-heating.

According to this embodiment, the following advantages are provided. Since the planar heater control circuit at the re-alignment is dedicated, and detachably mounted from the outside of the main body, it is unnecessary to widen the operation temperature range of the temperature control circuit or enlarge the capacity for the re-alignment function which is rarely used. At the re-alignment, the liquid crystal drive circuit can be also placed at rest, thereby eliminating the necessity of widening the operation temperature range of the liquid crystal drive circuit.

13

The larger distance from the heater or the provision of an adiabatic structure, which is a measure to avoid the temperature elevation in the circuit portion in making the re-alignment, is not necessary, so that it is possible to make the best use of the feature of the liquid crystal display that the volume of the unit can be reduced.

EMBODIMENT 4

Figure 15A:
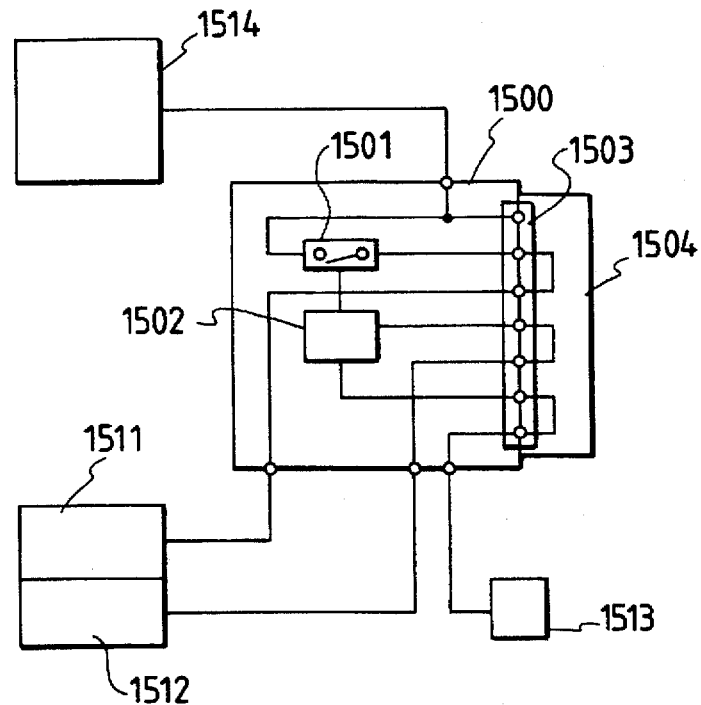
Figure 15B:
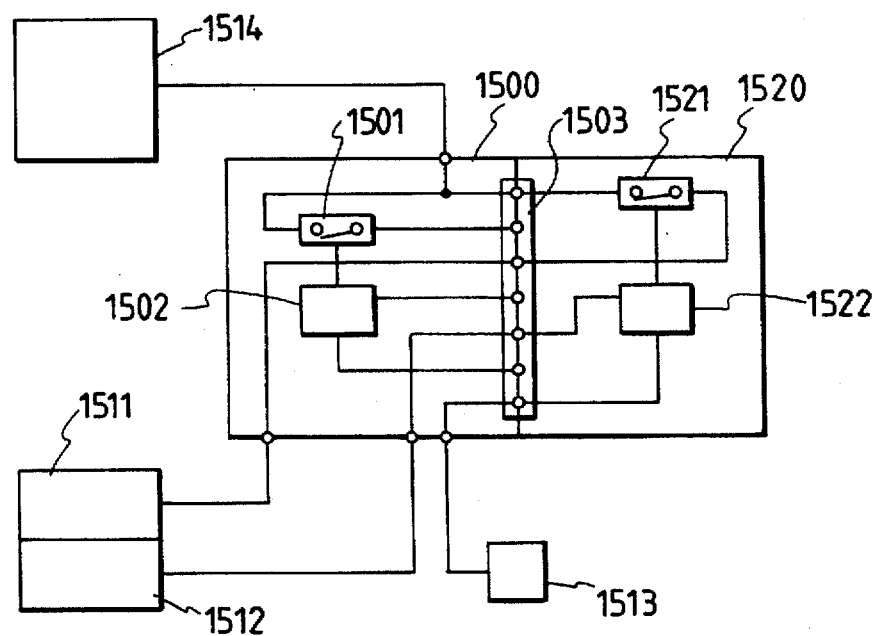

FIGS. 15A and 15B are block diagrams showing essential parts in another embodiment of the present invention. 1500 is a control circuit of a planar heater as described in embodiment 3. In FIG. 15A, the planar heater control circuit 1500 controls the planar heater 1514 by turning it on/off in accordance with a temperature signal from a temperature detection element attached to the liquid crystal panel. 1501 is a switching circuit, and 1511 is a circuit operation power source. The signal from the temperature detection element, a power source for the circuit operation and a power source for the planar heater are connected via a circuit board 1504 having a connector 1503. FIG. 15B shows a state where a planar heater control circuit 1520 for the re-alignment in the planar heater control circuit 1500 is connected thereto. The signal from the temperature detection element, the power source for the circuit operation and the power source for the planar heater are connected via the connector 1503, but the planar heater control circuit 1500 is interrupted from the circuit operation power source and thus placed at rest, by disconnecting the connector 1503 from the circuit board 1504 and instead connecting the planar heater control circuit 150 for the re-alignment, while at the same time the signal from the temperature detection element, the power source for the circuit operation, and the power source for the planar heater are switched for the re-alignment planar heater control circuit 1520.

Figure 16:
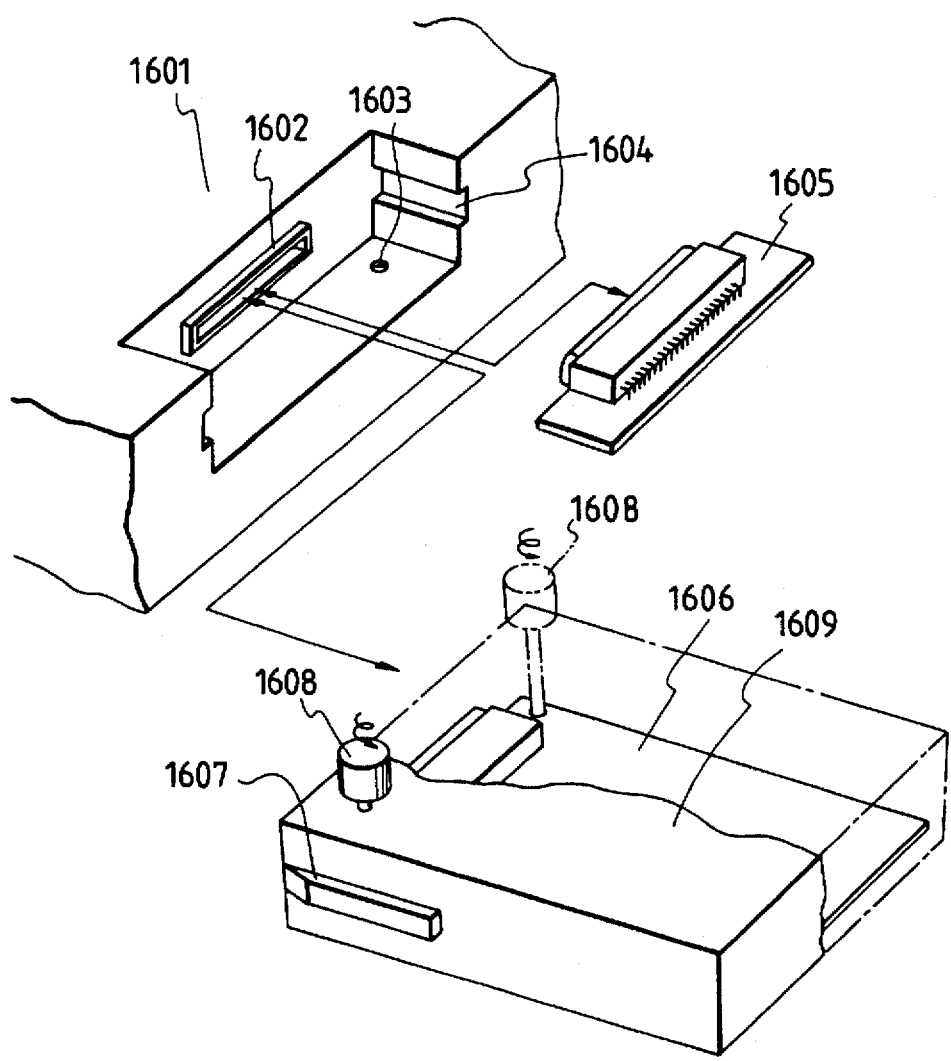

FIG. 16 is a perspective view showing essential parts in this embodiment. 1601 is a unit casing covering the outside of the liquid crystal display, and 1602 is a connector provided on the planar heater control circuit. In making the temperature compensation for the optimal display or retaining heat for the prevention of the crystallization, the circuit board 1605 is connected to the connector 1602 as previously described. In making the re-alignment, projections 1607 for the guide provided on a package casing 1609 containing the planar heater control circuit for the re-alignment are fitted thereinto along respective guide rails 1604 provided on the unit casing 1601, and secured with respective fixing screws 1608.

According to this embodiment, in addition to the effects as described in embodiment 3, the switching of circuit connection can be made very simply because the board can be exchanged by insertion, whereby the operation is simpler, and the fear of misoperation can be remarkably reduced. Also, the insertion and extraction of the connector can be facilitated by virtue of the guide rails, and the external force such as a pinch or bending exerting on the connector can be prevented. Owing to the combined use of the fixing screws, these effects can be made further remarkable.

EMBODIMENT 5

Figure 17:
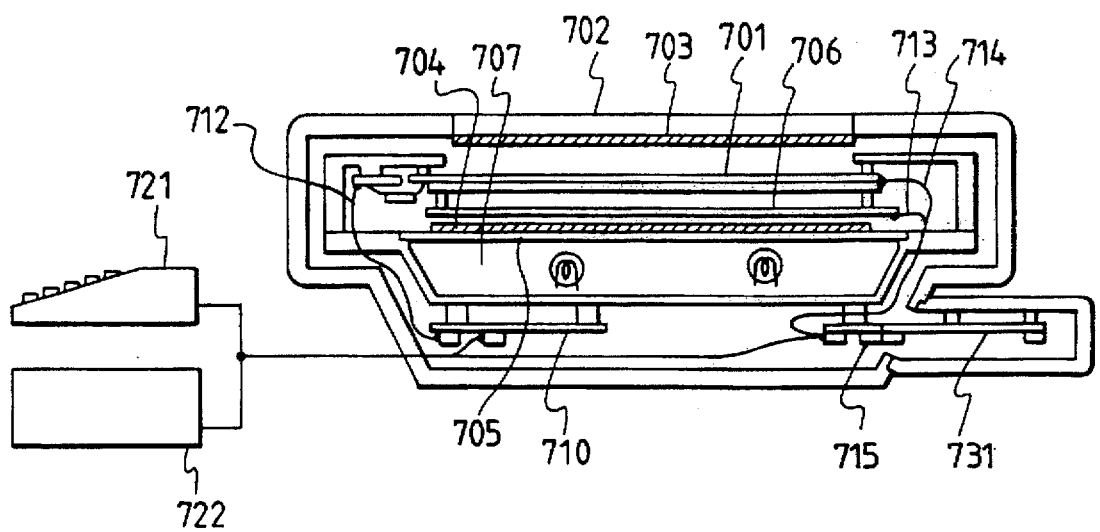

FIG. 17 is a view showing a cross section of a planar heater control circuit for the re-alignment connected to a liquid crystal display, according to another embodiment of the present invention. In this embodiment, the use temperature range or the retained temperature range of the display is limited, and the temperature control within the unit for the optimal drawing or the prevention of crystallization is unnecessary. Therefore, the normal planar heater control circuit is not contained, and there are provided a planar heater 706, a connecting lead 713, a temperature detection element 714, and a connector 715 to a re-alignment planar heater control circuit 731. In making the re-alignment, the power supply to a liquid crystal drive circuit 710 is interrupted, and switched to the re-alignment planar heater control circuit 731. The temperature elevation up to the retained temperature range is permitted for a circuit board of the liquid crystal drive circuit 710. On the other hand, the re-alignment planar heater control circuit board 731 will not involve the temperature elevation except for the self-heating in making the re-alignment, and can be used under low temperature environments, because the circuit board is connected externally of the unit.

According to this embodiment, in a liquid crystal display in which the liquid crystal panel is not normally heated by the planar heater, it is possible to implement the re-alignment in the liquid crystal display, without widening the operation temperature range of the liquid drive circuit or providing an adiabatic structure on the circuit board.

EMBODIMENT 6

Figure 18:
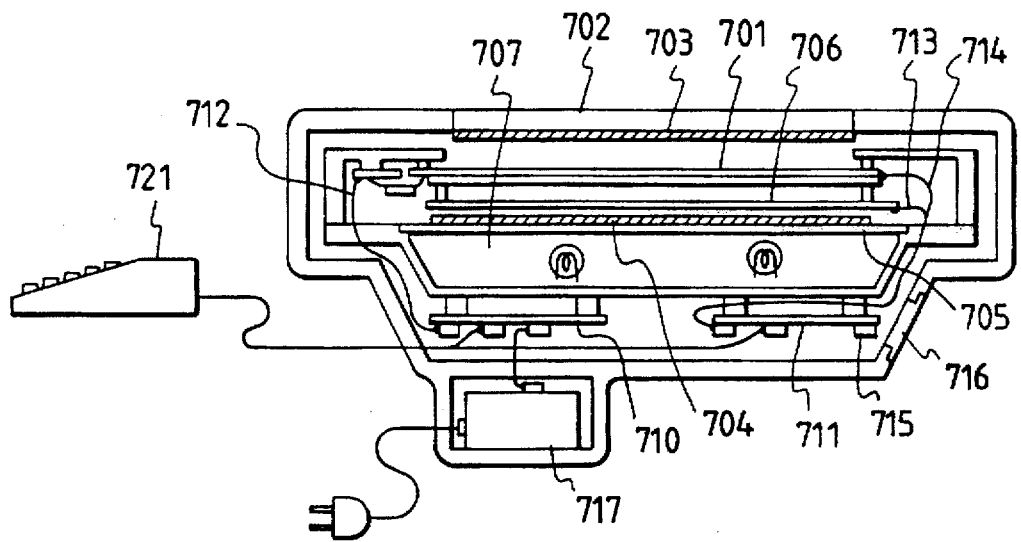

FIG. 18 is a view showing a cross section of another liquid crystal display having a heater control circuit according to the present invention.

This embodiment is substantially the same as embodiment 3, except that a secondary power source having a lower power contained in the main body is used to make the temperature compensation to obtain the optimal conditions for the drawings, or retain heat to avoid the crystallization, and a primary power source capable of supplying a larger power is used to make the re-alignment. That is, the liquid crystal drive circuit 710 and the planar heater control circuit 711 are supplied with the power from the secondary power source 717 contained within the unit to make the display on the liquid crystal panel, the temperature compensation for the optimal display, or the heat retention for the prevention of crystallization. In this unit, the compactization of unit is sought by using the power source 717 of 20 W.

Figure 19:
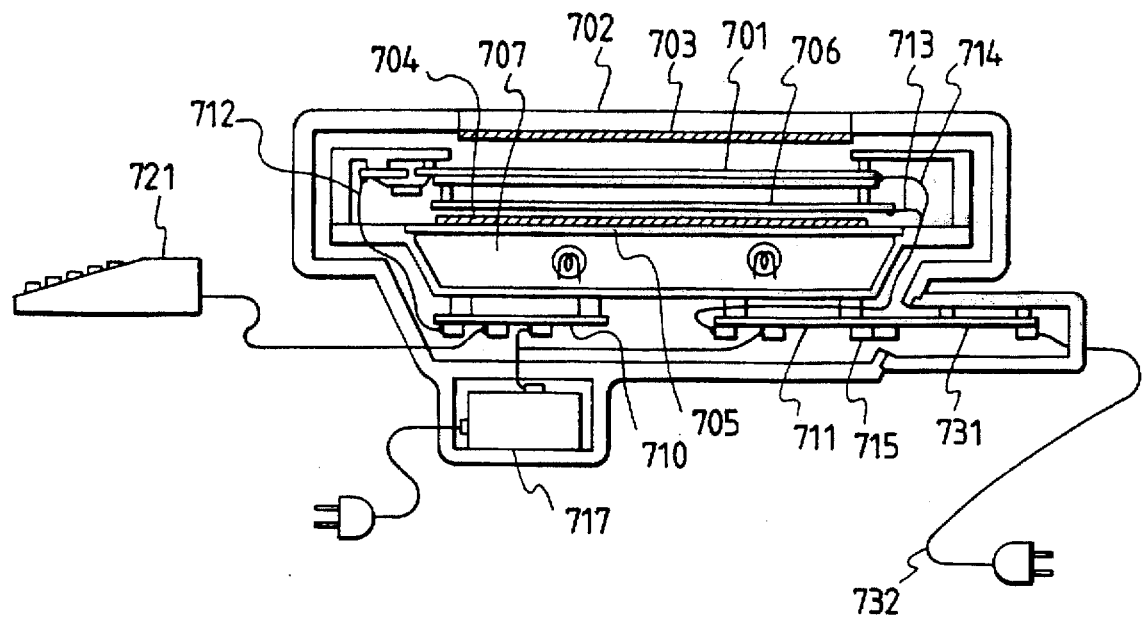

FIG. 19 shows a state where the re-alignment control circuit 731 for carrying out the re-alignment is connected externally of the unit of FIG. 18. In this state, the liquid crystal drive circuit 710 and the planar heater control circuit 711 are not supplied with the power, and thus at rest. The re-alignment control circuit 731 is supplied with a power of 150 to 270 W from the primary power source 732 which is a commercially available power source to conduct the electricity to the planar heater and carry out the re-alignment.

Figure 20:
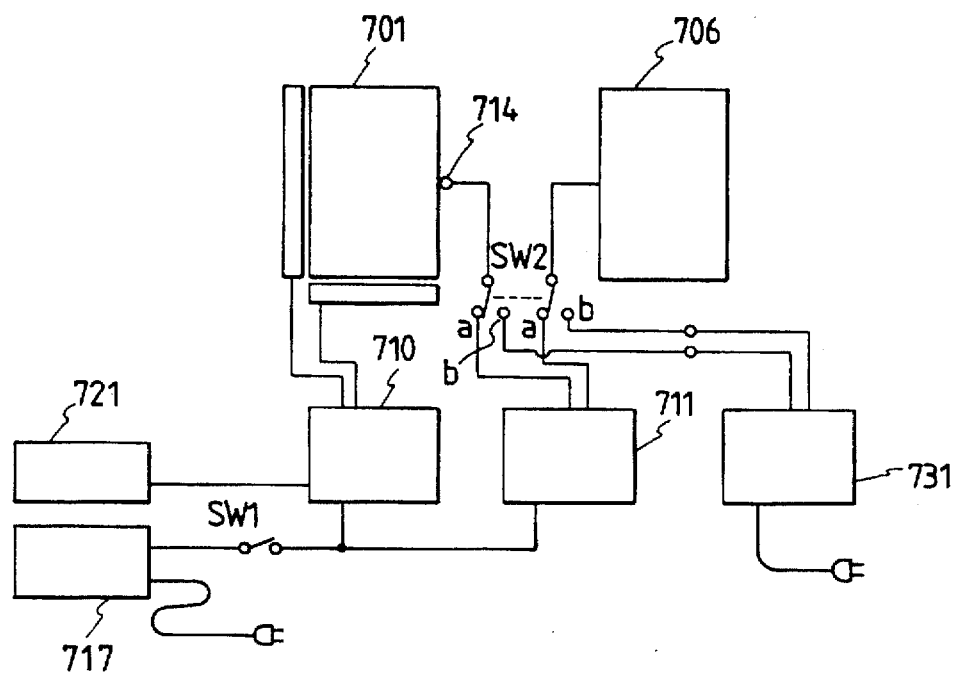

FIG. 20 is a block diagram for the electrical constitution in this embodiment. In the normal service state, the liquid crystal drive circuit 710 controls the liquid crystal panel 701 based on the power from the power source 717 and a signal from the data generator circuit 721 to display the information. The planar heater 706 is controlled by being turned on/off based on the temperature information from the temperature detection element 714, and retains the liquid crystal panel 701 at a temperature suitable for the drawing. When the unit is not used, the temperature is retained at a required degree so that the temperature of the liquid crystal panel 701 may not be lowered down to a crystallization temperature. When the re-alignment is conducted, SW1 is switched to interrupt the power to the liquid crystal drive circuit 710 and the planar heater control circuit 711, thereby make them at rest. At the same time, the connection to the temperature detection element 714 and the planar heater is switched to the re-alignment control circuit 731 using SW2. The liquid crystal panel 701 of FIG. 20 may be either a matrix driven liquid crystal panel or a TFT liquid crystal panel having a switching element.

Figure 21:
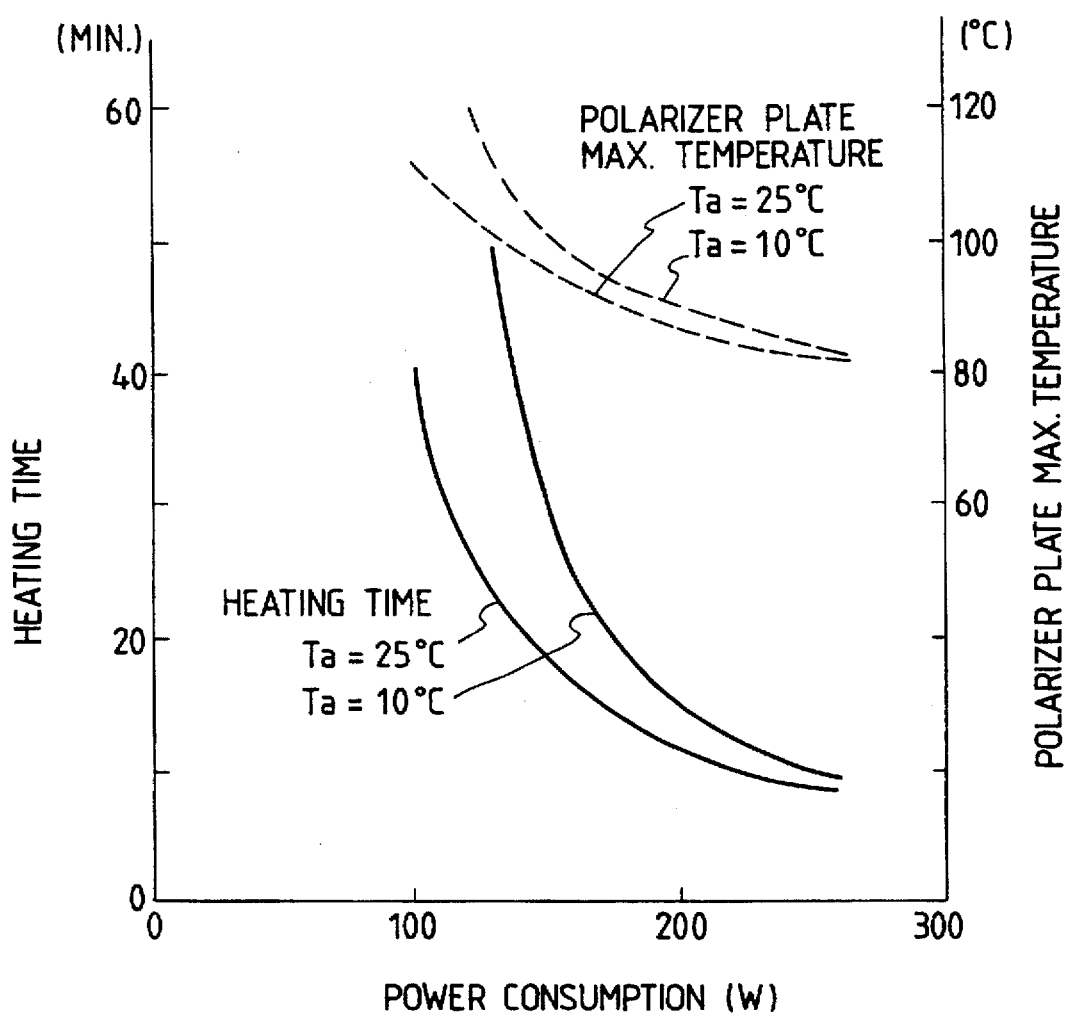
FIG. 21 is a graph representation for explaining the relation between the heating time and the temperature change of a lower polarizer plate.

FIG. 21 is a graphic representation showing the relation of the time required for the temperature elevation and the temperature of a lower polarizer plate when the power is changed in the re-alignment. The polarizer plate is weakeast to the heat among the components of the unit, in which the deterioration in the optical characteristics will proceed above 10° C. even in a short time. From the figure, it will be found that the reliability may be damaged unless the re-alignment is made under the environment at 130 W or greater and 25° C., or under the environment of 150 W or greater and 10° C. When the greater power is supplied, the shorter time is required to elevate the temperature up to a temperature necessary for the re-alignment. To obtain the panel surface temperature necessary for the re-alignment, a power of 90 W under the environment of 10° C., or a power of 75 W or greater under the environment of 25° C. is required, but in a more practical time, a power of 140 W or greater is required.

This embodiment provides the following advantages. At the re-alignment, a dedicated planar heater control circuit is used with a commercial primary power source capable of supplying a greater electric power, thereby taking a temperature elevation time of about thirty minutes, so that the re-alignment can be made in a practical duration. Since the temperature of a thermally weak polarizer plate need not be elevated excessively, the reliability of the unit can be assured. Moreover, since the contained power source having a smaller power is used for the normal planar heater control, the compactization of the unit can be realized, and the required insulation distance or the safety measure can be simplified, whereby it is possible to make the best use of a feature with the liquid crystal display that the volume of the unit can be reduced.

While the board of the re-alignment planar heater control circuit is directly connected via a connector within the liquid crystal display in this embodiment, it will be appreciated that it may be connected, for example, via a cable from the connector within the liquid crystal display, without any trouble, if the re-alignment planar heater control circuit is provided externally of the liquid crystal display.

EMBODIMENT 7

Figure 22:
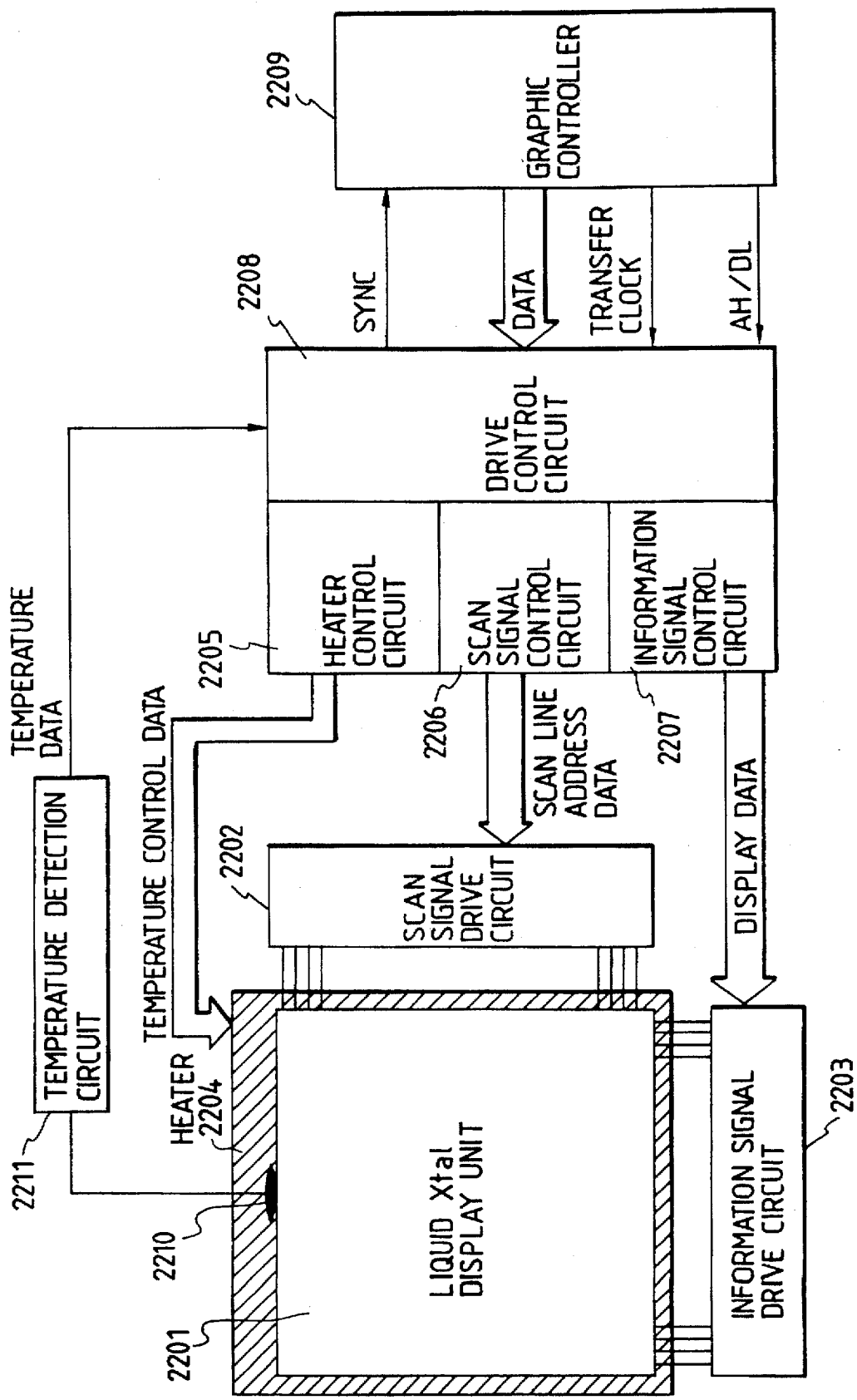
FIG. 22 is a block diagram for explaining a configuration of a liquid crystal display according to an embodiment of the present invention.

FIG. 22 is a configurational view of a liquid crystal display according to another embodiment of the present invention. In the same figure, 2209 is a graphic controller, 2208 is a drive control circuit, 2205 is a heater control circuit, 2206 is a scan signal control circuit, 2207 is an information signal control circuit, 2204 is a heater (plate-like heater), 2202 is a scan signal drive circuit, 2203 is an information signal drive circuit, 2201 is a liquid crystal display, 2210 is a temperature detection element, and 2211 is a temperature detection circuit. Data transferred from the graphic controller 2209 passes through the drive control circuit 2208 to the heater control circuit 2205, the scan signal circuit 2206, and the information signal circuit 2207 to be converted into the address data and the display data. Also, the temperature of the liquid crystal display is input via the temperature detection element 2210 into the temperature detection circuit 2211, which temperature is passed as a temperature data through the drive control circuit 2208 to the scan signal control circuit 2206 and the heater control circuit 2205. And in accordance with the address data and the display data, the scan signal drive circuit 2203 generates a scan signal to drive a scan electrode of the liquid crystal display 2201. Also, in accordance with the display data, the information signal drive circuit 2203 applies an information signal to an information electrode.

Figure 24:
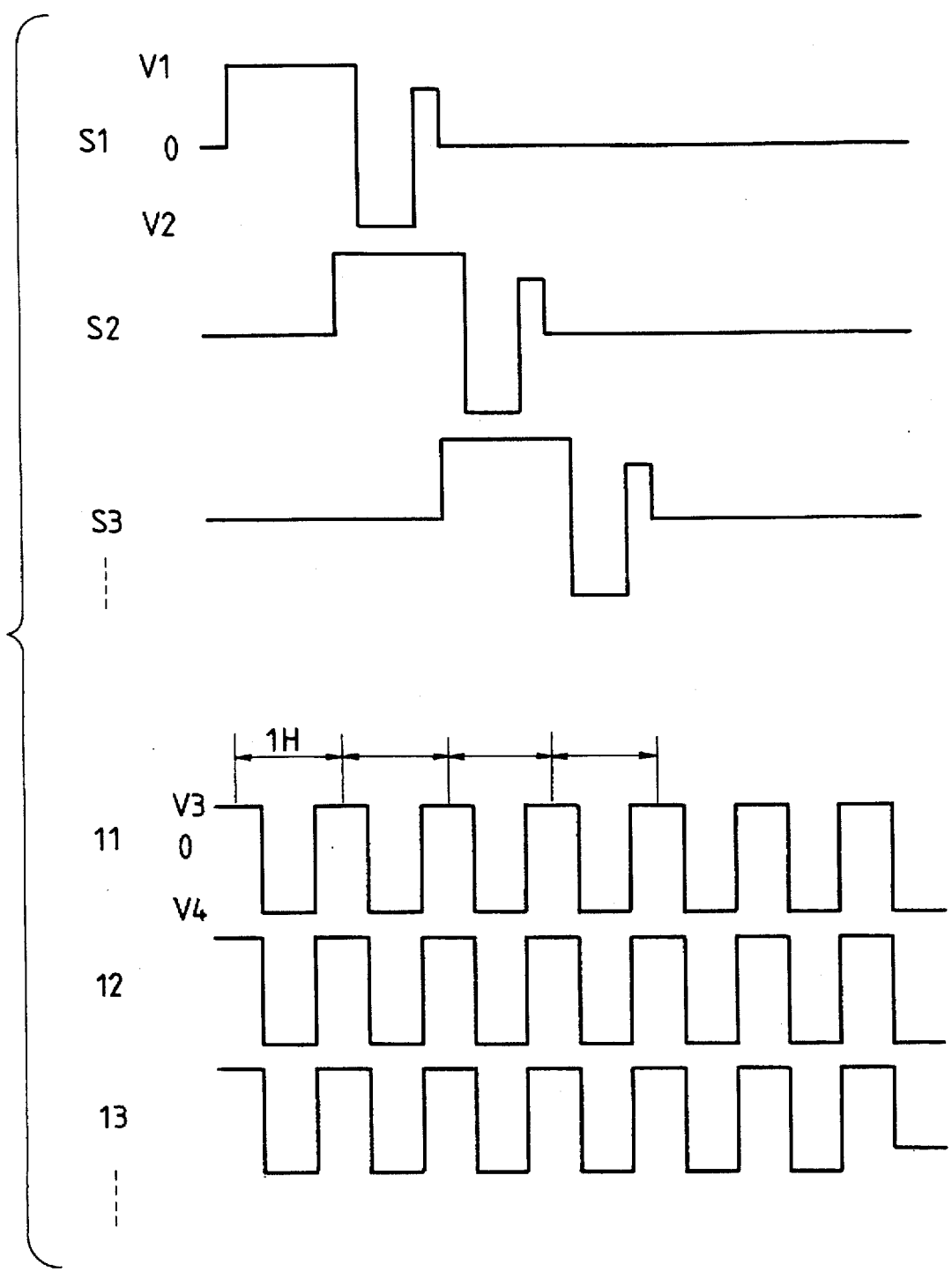
FIG. 24 is a graphic representation showing an example of driving waveform for the liquid crystal panel.
Figure 25:
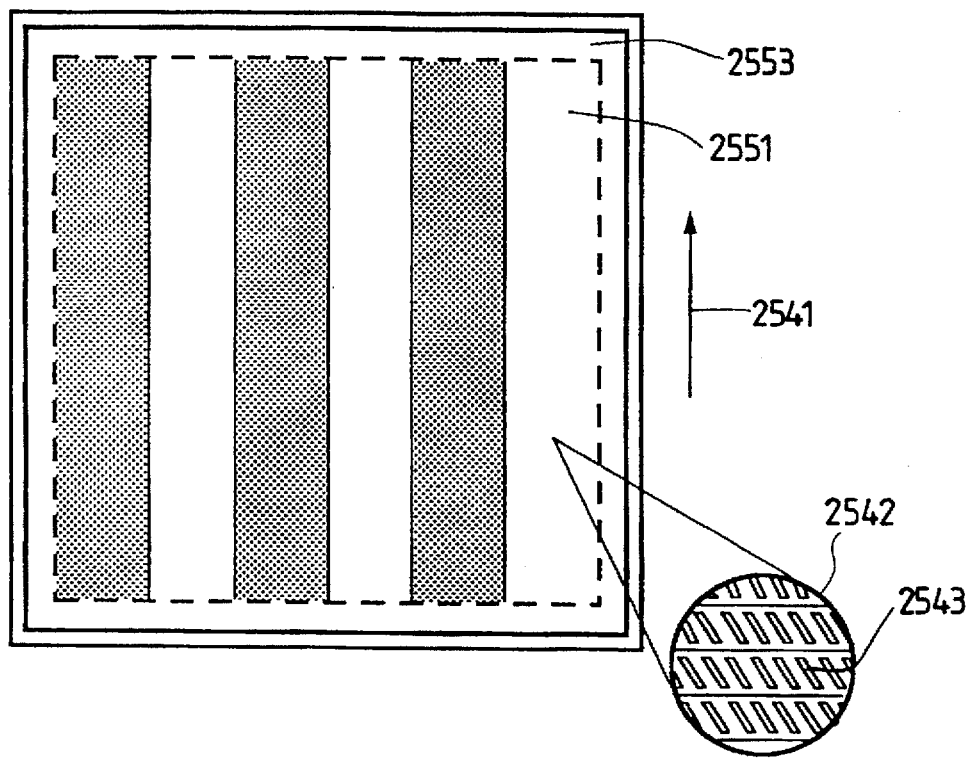
FIG. 25 is a schematic representation for explaining an image display example for the liquid crystal panel.

In FIG. 1, a cross-sectional view of the unit in this embodiment is shown. In this constitution, if the continuous display of image is made with multiplexing drive using the drive waveforms as shown in FIG. 24, the change in cell thickness and the change in threshold Vth arise. Note that in FIG. 24, S1, S2 and S3 represent a voltage waveform applied to the scan signal line, and 11, 12 and 13 represent a voltage waveform applied to the typical information signal line. In FIG. 25, 2551 (area within broken lines) is a display area, 2553 is a frame display portion, 2541 is a rubbing direction, 2542 is a smectic layer, and 2543 is a liquid crystal molecule. The drive voltage is 25V, and the used liquid crystal have the following characteristics.

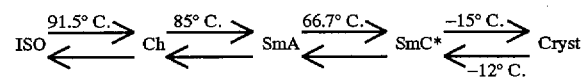

From the experiments by the present inventors, it has been found that when the variation rate in cell thickness is 10% or greater, the drive margin disappears including various dispersions, and the display quality is degraded. Also, it has been found that if the change in cell thickness exceeds 0.2 µm, blurs nervous to the user's eyes empirically occur and the display quality is degraded.

Figure 23A:
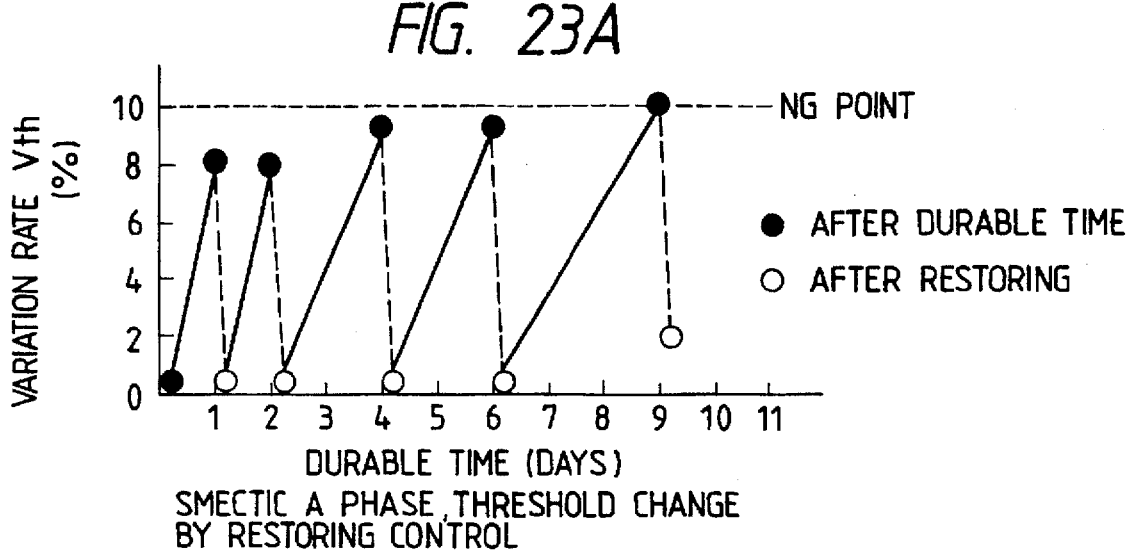
FIGS. 23A, 23B and 23C are graphic representations for explaining the variation rate of Vth relative to the durable time, the change in cell thickness relative to the durable time, and the change in panel surface temperature with time, respectively.
Figure 23B:
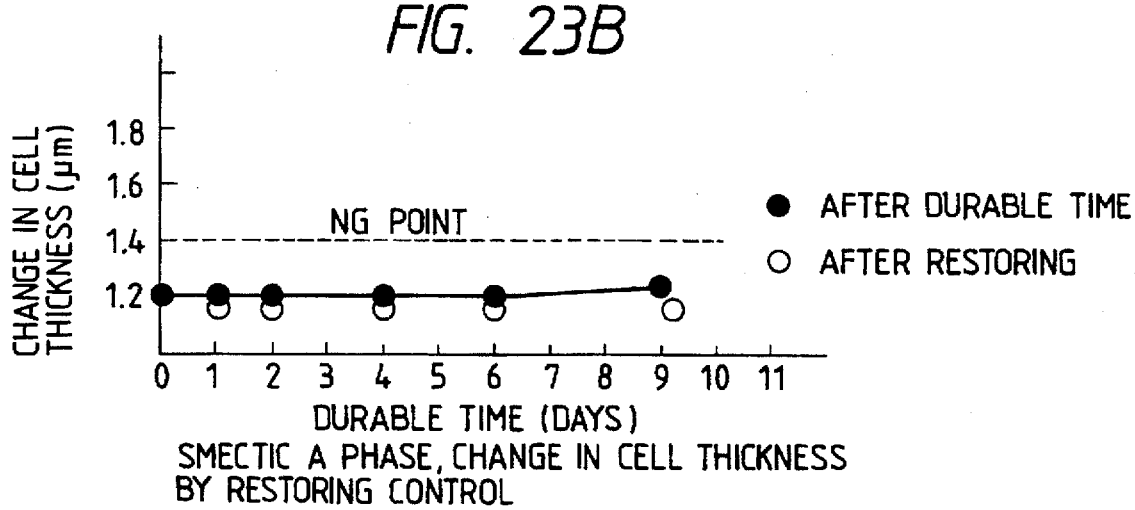
Figure 23C:
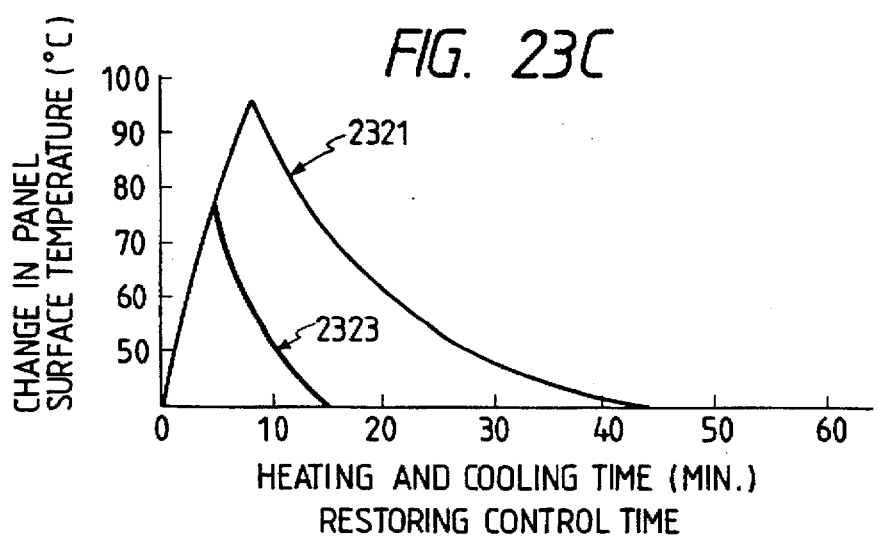

FIG. 23C is a graph showing the temporal change of the panel surface temperature caused in a smectic A phase restoring process. The smectic A phase restoring process is performed by controlling the heater 2204 with the heater control circuit 205 so that the liquid crystal display unit 2201 (liquid crystal panel) is heated above a transition temperature to the smectic A phase, and then cooled slowly.

FIG. 23A is a graph showing the variation rate of threshold Vth in performing the smectic A phase restoring process after displaying a pattern as shown in FIG. 25 on the liquid crystal panel. The black dot indicates the value after continuous durable display, and the white dot indicates the value after restoring process. FIG. 23B is a graph showing the change in cell thickness in performing the smectic A phase restoring process after the continuous drive of the liquid crystal panel. In both figures, it can be found that the threshold and the cell thickness are changed in making the continuous drive, thereby tending to degrade the display quality, but in order not to exceed a critical value (NG point) determined by the permissible display quality, it is required that the smectic A phase restoring process be performed within forty eight hours.

From FIG. 23C, it can be found that the time required to perform the smectic A phase restoring process is roughly one-third that required for the re-alignment. In the same figure, a curve 2323 indicates when the panel plane temperature is controlled to be elevated up 75° C. at which the liquid crystal becomes the SmA phase, in which the time required for the restoring process is about 15 minutes. A curve 2321 indicates when the re-alignment is performed at the same environmental temperature and consumption power, in which the panel surface temperature is controlled to be elevated up to 95° C. of the ISO phase temperature. In this case, the duration is about forty five minutes, and it can be found that the time required for the smectic A phase restoring process is greatly shortened to about one-third that of the re-alignment process which is a conventional typical restoring process for the alignment defect such as sanded texture in the liquid crystal panel.

According to this embodiment, since the liquid crystal is heated to the SmA phase, and cooled slowly, it is possible to restore the display quality, in a shorter time, from its degradation state caused by the change in cell thickness and the change in threshold which may occur by the movement of liquid crystal molecules in making the continuous drive. Also, the thermal stress acting on the liquid crystal as well as peripheral members is relieved, so that the durability characteristic of the whole unit can be greatly improved.

While in this embodiment the set temperature for controlling the heating was 75° C., it suffices to be a temperature at which the ferroelectric liquid crystal element reaches the next liquid crystal phase on the high temperature side thereof, and can be set depending on the temperature characteristic of used ferroelectric liquid crystal.

The time assured to retain the permissible display quality is forty eight hours in this embodiment, but may change depending on the drive condition (drive voltage, display pattern, pause time), whereby it is necessary to adjust that time depending on the service condition of liquid crystal display. It is not always required to clock the drive time and automatically perform the smectic A phase restoring process, but it does not matter that the process is initiated at an arbitrary timing by utilizing the time not used by the user around the set time, or with the manual operation.

As above described, according to the present invention, for example, by setting the upper limit of temperature adjustment range during the non-service to be lower than the upper limit of temperature adjustment range during the service, a high reliability can be assured without expediting the degradation of peripheral members disposed therearound or circuits, in which the image quality is not degraded at the early time of service, while the crystallization of liquid crystal is prevented with less consumption power during the non-service.

According to the invention, in a liquid crystal display using a heater control circuit, the re-alignment can be carried out safely in a state where a liquid crystal panel is incorporated into the display, without disassembly, only by making a small addition and extension to the temperature compensation function for the optimal image display and the heat retaining function for preventing the crystallization. Also, due to a small amount of addition and extension portion, a feature of restoration from a defective state such as the crystallization or sanded texture can be implemented for the re-alignment without a large burden, whereby it is possible to provide the display making the best use of the features such as a great amount of capacity and a high resolution provided on a ferroelectric liquid crystal.

Further, when a dedicated planar heater control circuit for the re-alignment requiring a larger electric power is connected externally of a liquid crystal display, it is unnecessary to widen the operation temperature range of the planar heater control circuit contained therein for use in the normal temperature control or enlarge the power capacity thereof in order to realize the re-alignment function having low service frequency. At the re-alignment, the liquid crystal drive circuit can be placed at rest, and it is unnecessary to widen the operation temperature range of the liquid crystal drive circuit. Further, a heat insulation structure for the circuit is unnecessary, so that it is possible to make the whole unit smaller and provide a ferroelectric liquid crystal display having the re-alignment function without impairing the feature of the liquid crystal display.

Moreover, when the planar heater control circuit for the re-alignment can be detachably mounted from the outside of the unit, and a primary power source is supplied from the re-alignment control circuit, the re-alignment can be made in a practical duration. Since the temperature of thermally weak members within the unit is not elevated excessively, the reliability of the unit can be assured. Further, since a power source contained for the temperature compensation to obtain the optimal conditions for the drawing or the heat retention for avoiding the crystallization can be constituted as a secondary power source having a lower electric power, the compactization of the power source can be attained, and the necessary insulation distance or safety measures can be simplified, whereby it is possible to make the beat use of a feature of the liquid crystal display that the volume of the unit can be reduced.

According to the present invention, there is provided heating means for heating a ferroelectric liquid crystal to the next liquid crystal phase on the high temperature side with a plate-like heater, whereby by heating the liquid crystal up to at least the next transfer phase on the high temperature side, and cooling it slowly, it is possible to correct for the change in cell thickness due to the movement of liquid crystal molecules, and the change in threshold Vth (pattern baking of liquid crystal molecules, monostabilization) due to writing of a fixed pattern, and restore the normal control for the liquid crystal. In doing so, it suffices that the heating is made to the next liquid crystal phase on the high temperature side, and because the heating and the cooling can be made in a relatively lower temperature range, the restoring processing can be made relatively rapidly. Thereby, the durability performance of the unit can be improved up to the level at which there is no practical problem.

It should be noted that the present invention is not limited to the embodiments as above described, and various changes can be effected without departing from the scope of the invention as defined by the claims, and the above embodiments can be combined appropriately within the scope of the present invention.

What is claimed is:

1. A liquid crystal display comprising:
    a liquid crystal panel having a pair of boards, a pair of electrodes, and a liquid crystal disposed between said boards, said panel having a service state in which an image is displayed on said panel and a non-service state in which no image is displayed on said panel;
    a heater provided near or adjacent said panel;
    means for detecting a temperature of said panel; and
    a control circuit for controlling an amount of heat generated by said heater in accordance with a comparison result between an output of said detecting means and either a first set temperature for use when said liquid crystal panel is in said service state, or a second set temperature, lower than said first set temperature, for use when said liquid crystal panel is in said non-service state,
    wherein said first set temperature is lower than a minimum temperature necessary for re-aligning said liquid crystal panel.

2. The liquid crystal display according to claim 1, characterized that said liquid crystal is a ferroelectric liquid crystal.

3. The liquid crystal display according to claim 2, characterized that said ferroelectric liquid crystal is a chiral smectic liquid crystal.

4. The liquid crystal display according to claim 1, further comprising selection means for selecting at least one of said first set temperature and said second set temperature.

5. The liquid crystal display according to claim 1, wherein said heater is a substantially planar or planar heater.

6. The liquid crystal display according to claim 1, further comprising setting means for setting said first set temperature and said second set temperature.

7. The liquid crystal display according to claim 1, wherein an upper limit of a temperature adjustment range of said non-service state is lower than a lower limit of a temperature adjustment range that of said service state.

8. A heater control circuit for a liquid crystal display having a panel and a heater for generating heat with a supply of electric power, comprising:

a. a power supply circuit for controlling the electric power to be supplied to the heater;

b. a plurality of temperature decision circuits each for deciding whether a detected temperature of the panel is above a respective predetermined value based on an electric signal obtained by temperature detection means;

c. a clock circuit that indicates time after starting the supply of electric power to the heater; and d. a control circuit that controls said power supply circuit in response to said temperature decision circuits and said clock circuit, wherein the panel has a necessary minimum temperature for re-alignment and, when the detected temperature of the panel is not above a set temperature no higher than the necessary temperature within a predetermined time after starting the supply of electric power to the heater, the supply of electric power is compulsorily terminated.

9. The heater control circuit according to claim 8, characterized in that said power supply circuit conducts electricity to the heater, said temperature decision circuits decide when the panel reaches a predetermined temperature, and said control circuit terminates the conduction of electricity to the heater when the predetermined temperature is reached.

10. The heater control circuit according to claim 8, characterized in that a second predetermined time after the panel reaches a predetermined temperature, the supply of electric power to the heater is terminated and the re-alignment is terminated.

11. The heater control circuit according to claim 8, characterized in that the set temperature is equal to the necessary temperature.

12. The heater control circuit according to claim 8, characterized in that when a temperature signal indicated by the temperature detection means falls below a second set temperature set lower than a normal service temperature range, a failure of the temperature detection means is judged and re-alignment is compulsorily terminated.

13. The heater control circuit according to claim 8, wherein said electric power supply circuit is a switch circuit for tuning on/off the electric power.

14. A liquid crystal display comprising:

a. a liquid crystal drive circuit for driving said liquid crystal panel;

b. a heater provided near or adjacent said liquid crystal panel;

c. a first control circuit for controlling the amount of heat generated by said heater by detecting the temperature of said panel;

d. a first power source for supplying the electric power to a liquid crystal drive circuit and said first control circuit;

e. a connector for connecting a second control circuit externally of said liquid crystal display for controlling the amount of heat generated by said heater with an electric power supplied from a second power source different from said first power source by detecting the temperature of said panel.

15. The liquid crystal display according to claim 14, characterized in that said liquid crystal is a ferroelectric liquid crystal.

16. The liquid crystal display according to claim 14, characterized in that said ferroelectric liquid crystal is a chiral smectic liquid crystal.

17. A liquid crystal display characterized by comprising:

a. a liquid crystal panel having a pair of opposed boards each provided with an electrode, and a liquid crystal disposed between said boards;

b. a liquid crystal drive circuit for driving said liquid crystal panel;

c. a heater provided near or adjacent said liquid crystal panel;

d. a first control circuit for controlling the amount of heat generated by said heater by detecting the temperature of said panel;

e. a connector for connecting a second control circuit externally of said liquid crystal display for controlling the amount of heat generated by said heater by detecting the temperature of said panel.

18. The liquid crystal display according to claim 17, characterized in that when said second control circuit is connected to the unit, the power source for said first control circuit and said liquid crystal drive circuit is interrupted.

19. The liquid crystal display according to claim 17, characterized in that the interruption of a power supply to said first control circuit, and the switching of a signal line from said first control circuit to said second control circuit are performed by inserting a circuit board connectable via a connector to said first control circuit into said second control circuit.

20. The liquid crystal display according to claim 17, characterized in that said liquid crystal is a ferroelectric liquid crystal.

21. The liquid crystal display according to claim 17, characterized in that said ferroelectric liquid crystal is a chiral smectic liquid crystal.

* * * * *

UNITED STATES PATENT AND TRADEMARK OFFICE
CERTIFICATE OF CORRECTION

PATENT NO. : 5,744,819

DATED : April 28, 1998

INVENTOR(S) : TAKASHI YAMAMOTO, ET AL.      Page 1 of 3

It is certified that error appears in the above-identified patent and that said Letters Patent is hereby corrected as shown below:

COLUMN 1

Line 9, "an" should read --a--.

COLUMN 2

Line 2, "No. 1." should read --No. 1--.

COLUMN 4

Line 31, "the" should be deleted; and
    Line 66, "of" should read --of the--.

COLUMN 5

Line 51, "of" should read --of the--.

COLUMN 6

Line 30, "a" (both occurrences) should be deleted;
    Line 31, "light" should be deleted; and
    Line 40, "take" should read --to take--.

COLUMN 7

Line 26, "a" should be deleted.

COLUMN 8

Line 28, "of" should read --of the--; and
    Line 64, "of" should read --of the--.

UNITED STATES PATENT AND TRADEMARK OFFICE
CERTIFICATE OF CORRECTION

PATENT NO. : 5,744,819

DATED : April 28, 1998

INVENTOR(S) : TAKASHI YAMAMOTO, ET AL.

It is certified that error appears in the above-identified patent and that said Letters Patent is hereby corrected as shown below:

COLUMN 10

Line 25, "exceds" should read --exceeds--.

COLUMN 11

Line 11, "the" should be deleted;
    Line 47, "be ended more early." should read
        --end earlier.--; and
    Line 52, "therefor" should read --therefore--.

COLUMN 13

Line 54, "the external" should read --external--; and
    Line 55, "a pinch" should read --pinching--.

COLUMN 14

Line 39, "unit" should read --the unit--; and
    Line 66, "make" should read --making--.

COLUMN 16

Line 30, "blurs nervous" should read
        --blurs noticeable--; and
    Line 59, "up" should read --up to--.

COLUMN 17

Line 24, "of" should read --of the--.

UNITED STATES PATENT AND TRADEMARK OFFICE
CERTIFICATE OF CORRECTION

PATENT NO. : 5,744,819

DATED : April 28, 1998

INVENTOR(S) : TAKASHI YAMAMOTO, ET AL.

It is certified that error appears in the above-identified patent and that said Letters Patent is hereby corrected as shown below:

COLUMN 18

Line 15, "beat" should read --best--.

COLUMN 19

Line 12, "that" should be deleted; and
Line 59, "tuning" should read --turning--.

Signed and Sealed this

Eighth Day of December, 1998

Attest:

BRUCE LEHMAN

Attesting Officer

Commissioner of Patents and Trademarks